(12) United States Patent
Thangarasa et al.

(10) Patent No.: US 10,939,314 B2
(45) Date of Patent: Mar. 2, 2021

(54) WIRELESS DEVICE, NETWORK NODE AND METHODS PERFORMED THEREIN

(71) Applicant: Telefonaktiebolaget LM Ericsson (publ), Stockholm (SE)

(72) Inventors: Santhan Thangarasa, Vällingby (SE); Muhammad Kazmi, Sundyberg (SE); Iana Siomina, Täby (SE); Kazuyoshi Uesaka, Kanagawa (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/337,589

(22) PCT Filed: Oct. 2, 2017

(86) PCT No.: PCT/SE2017/050964
§ 371 (c)(1),
(2) Date: Mar. 28, 2019

(87) PCT Pub. No.: WO2018/063086
PCT Pub. Date: Apr. 5, 2018

(65) Prior Publication Data

US 2020/0037186 A1    Jan. 30, 2020

Related U.S. Application Data

(60) Provisional application No. 62/401,932, filed on Sep. 30, 2016, provisional application No. 62/401,938, filed on Sep. 30, 2016.

(51) Int. Cl.
*H04W 24/10* (2009.01)
*H04W 72/04* (2009.01)

(52) U.S. Cl.
CPC ....... *H04W 24/10* (2013.01); *H04W 72/0413* (2013.01)

(58) Field of Classification Search
CPC .................. H04W 24/10; H04W 72/0413
(Continued)

(56) References Cited

U.S. PATENT DOCUMENTS

2017/0230780 A1*  8/2017  Chincholi .............. H04L 1/0046
2017/0311189 A1* 10/2017  Almalfouh ............ H04W 24/08
2019/0124519 A1*  4/2019  Takiguchi .............. H04W 24/10

FOREIGN PATENT DOCUMENTS

EP         3051894 A1    8/2016
WO    2016048519 A1    3/2016

OTHER PUBLICATIONS

"NB-IOT RLM Enhancement for Rel-14", 3GPP TSG-WG4 Meeting #80; R4-166520; Gothenburg, Sweden, Aug. 22-26, 2016, pp. 1-3.
(Continued)

*Primary Examiner* — Faisal Choudhury
(74) *Attorney, Agent, or Firm* — Christopher & Weisberg, P.A.

(57) ABSTRACT

Embodiments herein relate to a method performed by a wireless device (10) for enabling the wireless device (10) to perform RLM of a cell (11) of a network node (12) in a wireless communication network (1). The wireless device (10) sends to a network node (12) serving the wireless device (10), e.g. the network node providing the cell, an indication indicating at least one recommended repetition level and/or recommended aggregation level, of at least one radio signal and/or control channel.

18 Claims, 7 Drawing Sheets

(58) Field of Classification Search
USPC .......................................................... 370/252
See application file for complete search history.

(56) References Cited

OTHER PUBLICATIONS

"RLM enhancements in Further enhanced MTC", 3GPP TSG-RAN WG4 Meeting #80; R4-166625; Gothenburg, Sweden, Aug. 22-26, 2016, pp. 1-2.

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0 (Dec. 2015), Dec. 2015, pp. 1-141.

"3rd Generation Partnership Project; Technical Specification Group Radio Access Network; Evolved Universal Terrestrial Radio Access (E-UTRA); Physical layer procedures (Release 13)", 3GPP TS 36.213 V13.2.0, Jun. 2016, pp. 1-381.

"3rd Generation Partnership Project; Technical Specification Group Radio Access Network; Evolved Universal Terrestrial Radio Access (E-UTRA); Requirements for support of radio resource management (Release 13)", 3GPP TS 36.133 V13.0.0, Jul. 2015, pp. 1-1412.

* cited by examiner

WIRELESS DEVICE, NETWORK NODE AND METHODS PERFORMED THEREIN

TECHNICAL FIELD

Embodiments herein relate to a wireless device, a network node and methods performed therein regarding wireless communication. In particular, embodiments herein relate to radio link monitoring (RLM) or handling RLM e.g. enabling radio link monitoring by the wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into areas or cell areas, with each area or cell area being served by a network node e.g., a Wi-Fi access point or a radio base station (RBS), which in some networks may also be called, for example, a "NodeB" or "eNodeB". The area or cell area is a geographical area where radio coverage is provided by the network node. The network node operates on radio frequencies to communicate over an air interface with the wireless devices within range of the network node. The network node communicates over a downlink (DL) to the wireless device and the wireless device communicates over an uplink (UL) to the network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication with user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several network nodes may be connected, e.g., by landlines or microwave, to a controller node, such as a radio network controller (RNC) or a base station controller (BSC), which supervises and coordinates various activities of the plural network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the network nodes are directly connected to the EPC core network. As such, the Radio Access Network (RAN) of an EPS has an essentially "flat" architecture comprising network nodes connected directly to one or more core networks.

A machine-to-machine (M2M) communication or machine type communication (MTC) is used for establishing communication between wireless devices such as machines and between machines and humans. The M2M communication may comprise exchange of data, signaling, measurement data, configuration information etc. The size of the wireless device may vary from that of a wallet to that of a base station. The wireless devices are referred to as MTC devices and are quite often used for applications like sensing environmental conditions e.g. temperature reading, metering or measurement e.g. electricity usage etc., fault finding or error detection etc. In these applications the MTC devices are active very seldom but over a consecutive duration depending upon the type of service e.g. about 200 ms once every 2 seconds, about 500 ms every 60 minutes etc. The MTC device may also perform measurements on other frequencies or other Radio Access Technologies (RAT).

The MTC device is expected to be of low cost and low complexity regarding components and functions, i.e. to be a low complexity/cost wireless device. A low cost wireless device envisaged for M2M operation may implement one or more low cost features like smaller downlink and uplink maximum transport block size e.g. 1000 bits, and/or reduced downlink channel bandwidth of e.g. 1.4 MHz for a data channel such as a Physical Downlink Shared Channel (PDSCH). A low cost wireless device may also support half duplex frequency division duplex (HD-FDD) operation and comprise one or more of the following additional features: single receiver (1 Rx) at the wireless device, smaller downlink and/or uplink maximum transport block size, e.g. 1000 bits, and reduced downlink channel bandwidth of e.g. 1.4 MHz for a data channel. The low cost wireless device may also be termed or referred to as low complexity wireless device or UE.

Path loss between the MTC device and the network node such as a base station may be very large in some scenarios e.g. when the MTC device is used as a sensor or a metering device located in a remote location such as in a basement of a building. In such scenarios the reception of a signal from the network node is very challenging. For example the path loss can be worse than 20 dB compared to normal operation. In order to cope with such challenges the coverage in uplink and/or in downlink has to be substantially enhanced. This is realized by employing one or plurality of advanced techniques in the wireless device and/or in the network node for enhancing the coverage. Some non-limiting examples of such advanced techniques are, but not limited to, transmit power boosting, repetition of transmitted signal, applying additional redundancy to the transmitted signal, use of advanced/enhanced receiver etc. In general when employing such coverage enhancing techniques the M2M communication is regarded to be operating in a 'coverage enhancing mode'. A low cost wireless device, e.g. a wireless device with 1 Rx, may also be capable of supporting enhanced coverage mode of operation.

The purpose of Radio Link Monitoring (RLM) is to monitor a radio link quality of a connected serving cell and use that information to decide, at the wireless device, whether the wireless device is in in-sync or out-of-sync to that serving cell. RLM is carried out by the wireless device performing measurement on downlink reference symbols e.g. Cell-specific reference Symbols/signals (CRS), in a Radio Resource Control (RRC)_CONNECTED state. If the results of the radio link monitoring indicate a number of consecutive out of sync indications then network node may declare radio link failure (RLF) until the RLM indicates several consecutive in-sync indications. The actual procedure is carried out by comparing the estimated downlink reference symbol measurements to some target Block Error Rate (BLER) e.g. a Qout and a Qin. Qout and Qin correspond to Block Error Rate (BLER) of hypothetical Physical Downlink Control channel (PDCCH) or physical control format indicator channel (PCFICH) transmissions from the serving cell. The thresholds may be in terms of BLER. These correspond to different Signal to Noise Ratio (SNR) levels in the wireless device, i.e. 2% BLER target correspond to a certain dB target and 10% BLER target correspond to another dB target in the wireless device.

Radio measurements done by the wireless device are typically performed on the serving cell as well as on neighbour cells over some known reference symbols or pilot sequences. The radio measurements are done on cells on an intra-frequency carrier, inter-frequency carrier(s) as well as on inter-Radio Access Technology (RAT) carriers(s), depending upon the wireless device capability and whether it supports that RAT. To enable inter-frequency and inter-RAT measurements for the wireless device so called measurement gaps may be required, and the network node or another radio network node may have to configure the measurement gaps.

The radio measurements are done for various purposes. Some example measurement purposes are: mobility, positioning, self-organizing network (SON), minimization of drive tests (MDT), operation and maintenance (O&M), network planning and optimization etc. Examples of measurements in LTE are Cell identification also known as (aka) Physical Cell ID (PCI) acquisition, Reference Symbol Received Power (RSRP), Reference Symbol Received Quality (RSRQ), cell global ID (CGI) acquisition, Reference Signal Time Difference (RSTD), UE RX-TX time difference measurement, Radio Link Monitoring (RLM), which RLM comprises: Out of Synchronization (out of sync) detection and In Synchronization (in-sync) detection etc.

RLM is entirely carried out in the wireless device. The detection of out of sync (OoS) and in-sync is based on the wireless device estimating the channel quality of the serving cell. If it is detected that wireless device is OoS, the wireless device start a certain timer and if OoS is detected a number of times, the wireless device finally declare RLF and turns OFF the transmitter chain. Channel State Information (CSI) measurements performed by the wireless device are used for scheduling, link adaptation etc. by a network node. Examples of CSI measurements or CSI reports are Channel Quality Indicator (CQI), Precoding Matrix Indicator (PMI), Rank Indicator (RI), etc. They may be performed on reference signals like CRS, Channel State Information-Reference signal (CSI-RS) or Demodulation Reference Signal (DMRS). The measurements may be unidirectional, e.g., DL or UL measurements, or bidirectional e.g., having UL and DL components such as Receive-Transmit (Rx-Tx), Round-Trip Time (RTT), etc.

A DL subframe #0 and DL subframe #5 carry synchronization signals, i.e. both Primary Synchronization Signal (PSS) and Secondary Synchronization Signal (SSS). In order to identify an unknown cell, e.g. new neighbor cell, the wireless device has to acquire a timing of that cell and eventually the Physical Cell Identity (PCI). This is called cell search or cell identification, or even cell detection. Subsequently the wireless device also measures RSRP and/or RSRQ of the newly identified cell in order to use the radio measurement itself and/or in order to report the radio measurement to the network node. In total there are 504 PCIs. The cell search is also a type of radio measurement. The radio measurements may be done in all Radio Resource Control (RRC) states i.e. in RRC idle and connected states.

At least the following problems may be envisioned with the existing solutions:

In enhanced MTC and NarrowBand Internet of Things (NB-IOT), wireless devices operate under different coverage levels which are also known as normal coverage denoted CEModeA and enhanced coverage denoted CEModeB.

The measurement accuracy requirement depends on coverage level experienced by the wireless device. The wireless devices operating under normal coverage can achieve relatively good Radio Resource Management (RRM) measurement accuracy in line with legacy LTE while the enhanced coverage measurement accuracy is more relaxed meaning that it is not always reliable. Hence, using such measurement for evaluating a radio link of the serving cell, aka radio-link monitoring procedure, or RLM, can result in incorrect evaluation.

SUMMARY

An object of embodiments herein is to provide a mechanism that improves the reliability of the RLM and thus the performance of the wireless communication network.

According to an aspect the object is achieved by providing a method performed by a wireless device for enabling the wireless device to perform RLM of a cell of a network node in a wireless communication network. The wireless device sends to a network node, may be the network node controlling the cell to perform RLM on or it may be a different one, serving the wireless device, an indication indicating at least one recommended repetition level and/or recommended aggregation level, of at least one radio signal and/or control channel.

According to another aspect the object is achieved by providing a method performed by a network node for enabling a wireless device in a wireless communication network to perform RLM of a cell of the network node. The network node receives, from the wireless device, an indication indicating at least one recommended repetition level and/or recommended aggregation level, of at least one radio signal and/or control channel.

According to embodiments herein the wireless device sends and recommends repetition level and/or aggregation level of at least one radio signal and/or control channel. This will enable an improved usage of resources as transmissions may be made more appropriate based on the recommended repetition level and/or aggregation level.

It is furthermore provided herein a computer program comprising instructions, which, when executed on at least one processor, cause the at least one processor to carry out any of the methods above, as performed by the network node or as performed by the wireless device. It is additionally provided herein a computer-readable storage medium, having stored thereon a computer program comprising instructions which, when executed on at least one processor, cause the at least one processor to carry out the method according to any of the methods above, as performed by the network node or as performed by the wireless device.

According to yet another aspect the object is achieved by providing a wireless device for enabling performing RLM of a cell of a network node in a wireless communication network. The wireless device is configured to send to a network node serving the wireless device, an indication indicating at least one recommended repetition level and/or recommended aggregation level, of at least one radio signal and/or control channel.

According to still another aspect the object is achieved by providing a network node for enabling a wireless device in a wireless communication network to perform RLM of a cell of the network node. The network node is configured to receive from the wireless device, an indication indicating at least one recommended repetition level and/or recommended aggregation level, of at least one radio signal and/or control channel.

Another advantage of embodiments herein is that the serving network node does not have to repeatedly transmit the same signals continuously or unnecessarily when the wireless device is in good coverage regardless of downlink measurement quality or strength since the wireless device sends back the recommended repetition level; and the radio resources used for transmission of signals are used more efficiently in a serving cell since repetition of signals is performed only when the wireless device needs repetitions to reliably carry out the RLM procedure. It also improves the wireless device battery life because the wireless device does not need to receive the unnecessarily repeated signals. Embodiments herein enable more accurate operation of RLM by taking into account the different operational scenarios of both the network node and the wireless device.

Thus, this results in providing a more reliable RLM for wireless devices e.g. having poor or limited capability or channel conditions, and this results in an improved performance of the wireless communication network.

BRIEF DESCRIPTION OF THE DRAWINGS

Embodiments will now be described in more detail in relation to the enclosed drawings, in which.

DETAILED DESCRIPTION

Figure 1A:
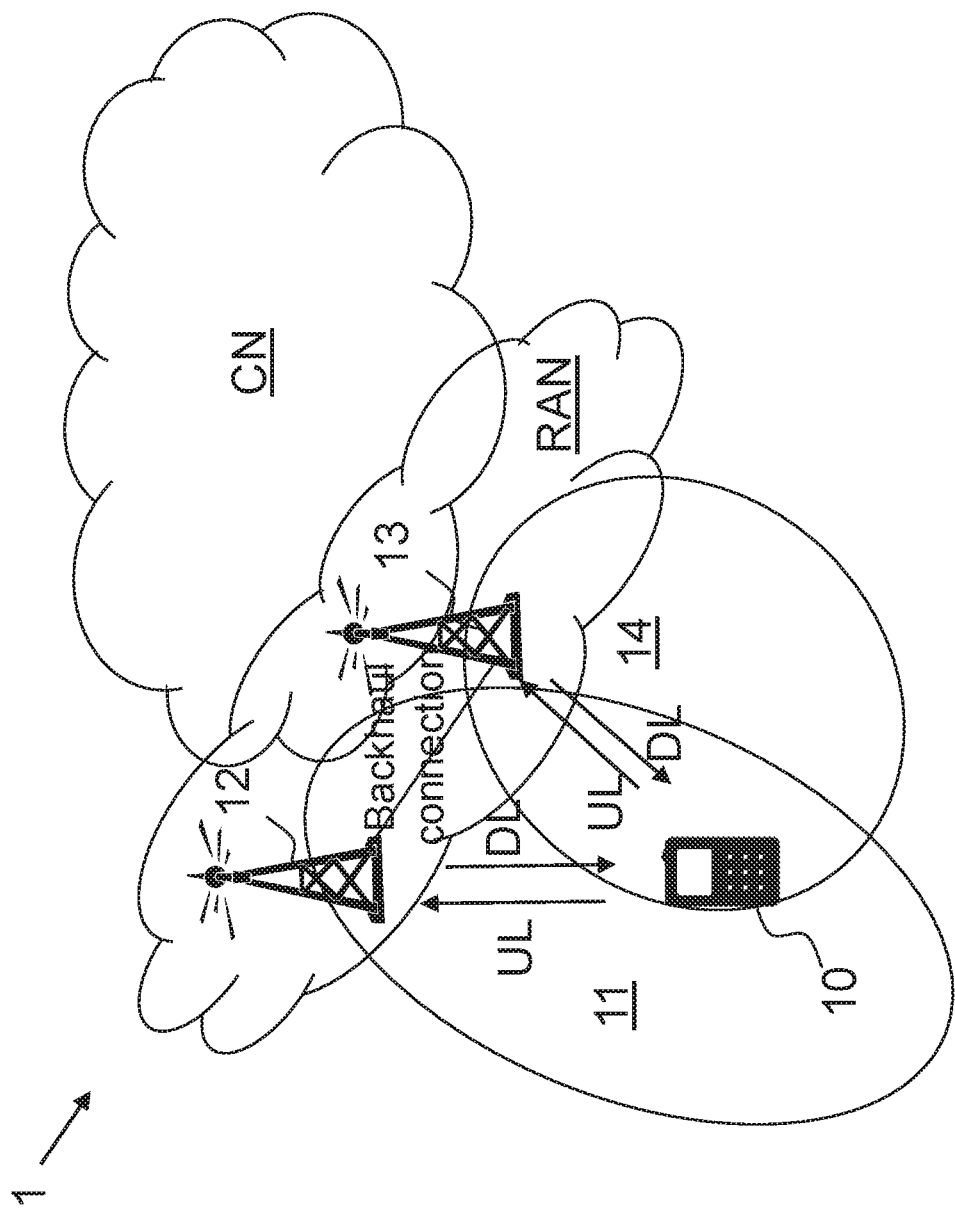
FIG. 1A is a schematic overview depicting a wireless communication network according to embodiments herein.

Embodiments herein relate to wireless communication networks in general. FIG. 1A is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first network node 12, also referred to as the network node, providing radio coverage over a geographical area, a first cell 11 or first area, of a first radio access technology (RAT), such as LTE, Wi-Fi, WiMAX or similar. The network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first network node 12 may be referred to as a serving network node wherein the first cell may be referred to as a serving cell, and the serving network node communicates with the wireless device 10 in form of DL transmissions to the wireless device 10 and UL transmissions from the wireless device 10.

Furthermore, the wireless communication network 1 comprises a second network node 13 providing radio coverage over a geographical area, a second cell 14 or second area, of a second RAT, such as LTE, Wi-Fi, WiMAX or similar. The second network node 13 may be a transmission and reception point e.g. a radio network node such as a WLAN access point or an Access Point Station (AP STA), an access controller, an access node, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the second network node 13 depending e.g. on the second radio access technology and terminology used. The first and second RAT may be the same or different RATs. The second network node 13 may be referred to as a neighbor network node.

The first network node 12 may communicate with the second network node 13 in the wireless communication network 1. This is done by the network nodes communicating with one another over a backhaul connection, e.g. an X2 connection, an S1 connection or similar, between the first network node 12 and the second network node 13.

According to prior art a network node can transmit the control channel, e.g. MTC PDCCH (MPDCCH), Narrowband PDCCH (NPDCCH), using inappropriate transmission parameters such as unnecessarily longer repeated transmission or larger resource allocation, aggregation level, which consumes the downlink radio resources for the network node, but also for the wireless device since it can cause RLF prematurely without allowing any time for the network node to recover the link.

Embodiments herein relate to a method that may be implemented in the wireless device 10 and a method that may be implemented in the first network node 12 to monitor/determine the downlink radio link quality of a cell, such as the first cell 11 or the second cell.

According to embodiments herein the wireless device reports a preferred repetition level and/or aggregation level by sending to the network node serving the wireless device, e.g. the first network node, an indication indicating at least one recommended repetition level and/or recommended aggregation level, of at least one radio signal and/or control channel. The network node may then adapt repetition level and/or aggregation level taking the indication into account. i.e. taking the indicated at least one recommended repetition level and/or recommended aggregation level into account.

Hence, the serving network node does not have to repeatedly transmit the same signals continuously or unnecessarily when the wireless device is in good coverage regardless of downlink measurement quality or strength since the wireless device sends back the recommended repetition level. Furthermore, the radio resources used for transmission of signals are used more efficiently in a serving cell since repetition of signals is performed only when the wireless device 10 needs repetitions to reliably carry out the RLM procedure. It also improves the wireless device's battery life because the wireless device 10 does not need to receive the unnecessarily repeated signals. Embodiments herein enable more accurate operation of RLM by taking into account the different operational scenarios of both the network node 12 and the wireless device 10. Some embodiments herein enable the wireless device 10 to maintain a connection with the first cell even when operating at an extended cell coverage e.g. at very low Signal to Interference plus Noise Ratio (SINR) such as at −12 dB or below. Another advantage of some embodiments herein is that the wireless device is enabled to perform RLM functionality when being a wireless device capable of operating in an enhanced coverage mode, such as an enhanced MTC wireless device. Such a wireless device may be a sensor or similar. Other advantages may be: Stable and improved radio link monitoring performance of wireless devices operating under different coverage levels; the serving network node may recover the wireless devices with poor radio link quality back to good coverage; and the wireless devices operating under different coverage levels may successfully receive signals from the first cell, so as to be connected to the first cell as long as possible.

The wireless devices operating under low coverage enhancement, i.e. enhanced coverage, may be a different type of wireless devices than typical handheld wireless devices. The wireless devices capable of enhanced coverage could for example be mounted in a wall/tower or other fixed position and could therefore be less mobile than traditional handheld devices. To support enhanced coverage and narrower bandwidth operation, e.g. 200 KHz, 1.4 MHz etc., of such wireless devices, new DL control channels are introduced. Such a new DL control channel is denoted MPDCCH and may particularly be used by the wireless device 10 for RLM operation.

The normal and enhanced or extended coverage operations may typically take place on narrower wireless device Radio Frequency (RF) bandwidth (BW) compared with the system bandwidth aka cell BW, cell transmission BW etc. In some embodiments the RF BW of the wireless device may be the same as the system bandwidth. Examples of narrow RF BWs are 200 KHz, 1.4 MHz etc. Examples of system BW are 200 KHz, 1.4 MHz, 3 MHz, 5 MHz, 10 MHz, 15 MHz, 20 MHz etc. In case of extended/enhanced coverage, the wireless device 10 may be capable of operating under lower signal quality level, e.g. Signal to Noise Ratio (SNR), SINR, ratio of average received signal energy per subcarrier to total received power per subcarrier ($\hat{E}s/Iot$)), RSRQ etc, compared to what is possible in legacy systems. The coverage level enhancement may vary with the operational scenario and may also depend on the wireless device type. For example, a wireless device which is located in a basement with bad coverage may need larger or higher level of coverage enhancement, e.g. 10 dB, compared to a wireless device which is at a cell border, e.g. 5 dB.

The coverage level may be expressed in terms of:
received signal quality and/or received signal strength at the wireless device with regards to its serving cell and/or
received signal quality and/or received signal strength at the serving cell with regards to the wireless device.

Examples of signal quality are SNR, SINR, CQI, RSRQ, $\hat{E}s/Iot$ etc. Examples of signal strength are path loss, RSRP etc.

Consider an example of 2 coverage levels defined with regards to signal quality (e.g. SNR) at the wireless device comprising:
Coverage enhancement level 1 (CE1) comprising of SNR≥−6 dB at wireless device with regards to its serving cell; and
Coverage enhancement level 2 (CE2) comprising of −12 dB≥SNR<−6 dB at wireless device with regards to its serving cell.

Consider another example of 4 coverage levels comprising:
Coverage enhancement level 1 (CE1) comprising of SNR≥−6 dB at wireless device with regards to its serving cell;
Coverage enhancement level 2 (CE2) comprising of −12 dB≥SNR<−6 dB at wireless device with regards to its serving cell;
Coverage enhancement level 3 (CE3) comprising of −15 dB≥SNR<−12 dB at wireless device with regards to its serving cell; and
Coverage enhancement level 4 (CE4) comprising of −18 dB≥SNR<−15 dB at wireless device with regards to its serving cell In the above example the CE1 may also be interchangeably denoted normal coverage level, baseline coverage level, reference coverage level, legacy coverage level etc. On the other hand CE2-CE4 may be termed enhanced coverage level or extended coverage level.

Some examples of transmissions performed between the network node and the wireless device are:
Transmissions of Physical signals e.g. Reference signals,
Transmissions of Physical channels e.g. Control channel, multicast or broadcast channels,
Transmissions of Logical channels.

Physical signal and physical channel are well known terms as described in 3GPP TS 36.211 v.13.0.0. A physical signal comprises a set of resource elements used by the physical layer but does not carry information originating from higher layers. On the other hand a physical channel comprises of a set of resource elements carrying information originating from higher layers e.g. transport channel, RRC message etc. Examples of downlink physical signals are CRS, RS, PSS, SSS, Extended Synchronization Signal (ESS), CSI-RS, DMRS, Positioning Reference Signal (PRS), SRS, Multimedia Broadcast Single Frequency Network Reference Signal (MBSFN RS) etc. Examples of downlink physical channels are Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat request (ARQ) Indicator Channel (PHICH), Enhanced Physical Downlink Control Channel (EPDCCH), MPDCCH, etc. System information such as system information broadcast (SIB1bis) may also be transmitted over physical channel such as PDSCH.

The term time resource used herein may correspond to any type of physical resource or radio resource expressed in terms of length of time. Examples of time resources are: symbol, time slot, subframe, radio frame, transmission time Interval (TTI), interleaving time, special subframe, Uplink Pilot Time Stot (UpPTS) etc.

The term repetition of a signal/channel used herein may refer to transmitting at least two identically transmitted signals in different time resources e.g. in different subframes. Examples of signals are physical signals, e.g. CRS, PSS, SSS, NRS, NPSS, NSSS etc. where N stands for narrowband, and examples of channels are physical channels (e.g. PDCCH, ePDCCH, NPDCCH, MPDCCH, NPDSCH, PDSCH, PBCH, NPBCH, Physical Uplink Control channel (PUCCH), Physical Uplink Shared channel (PUSCH), NPUCCH, NPUSCH etc). The radio node (e.g. wireless device or network node) decodes the channel, e.g. MPDCCH, transmitted with repetition after receiving a first transmission of the channel and one or more retransmissions of the same channel, see e.g. background on enhanced machine type communication (eMTC), further-enhanced MTC (FeMTC) and NB-IoT wireless devices. The repetition of a signal may also interchangeably be called as "multi-shot transmission" of a signal, transmission of signal with repetition, transmission of signal in multiple time resources, control channel repetition, multiple transmissions of a signal, signal repetitions, number of signal repetitions etc. Typically the "multi-shot reception" or reception of signal transmitted with repetition is performed by the radio node after receiving multiple transmissions of the same signal from another radio node in consecutive time resources e.g. over X consecutive DL subframes, where the DL subframes are configured by the network node and may be indicated to the wireless device via signaling.

Under enhanced coverage operation some channels support repetitions. In some cases, this also depends on the supported bandwidth. As an example, PBCH is repeated in subframe #0 and also in one more subframe. This other subframe for PBCH depends on whether it is FDD or TDD system, In case it is FDD, the other subframe is #9 and for TDD it is subframe #5. In some cases, PBCH repetitions are not supported for narrow system bandwidth, e.g. 1.4 MHz.

Repetition is also supported for MPDCCH channel under enhanced coverage. In this case, repetitions across multiple subframes are supported as well as multiple repetition levels in time domain.

Likewise, repetition is also supported for PDSCH channel for wireless devices operating under enhanced coverage. Here, repetitions and/or bundling of PSDCH transmissions across multiple subframes are supported. Likewise, repetition is also supported for PDSCH channel for wireless devices operating under enhanced coverage. Here, different repetitions and/or bundling of PSDCH transmissions across multiple subframes are supported in time domain. Depending on the operating scenario (e.g. the SNR levels) the network may adapt the repetition level.

Similar to the downlink channels, repetitions are also supported in the uplink. For wireless devices operating under enhanced coverage different repetitions and bundling can be configured. And this level of repetitions and bundling can be adapted over time e.g. depending on changing radio conditions.

Figure 1B:
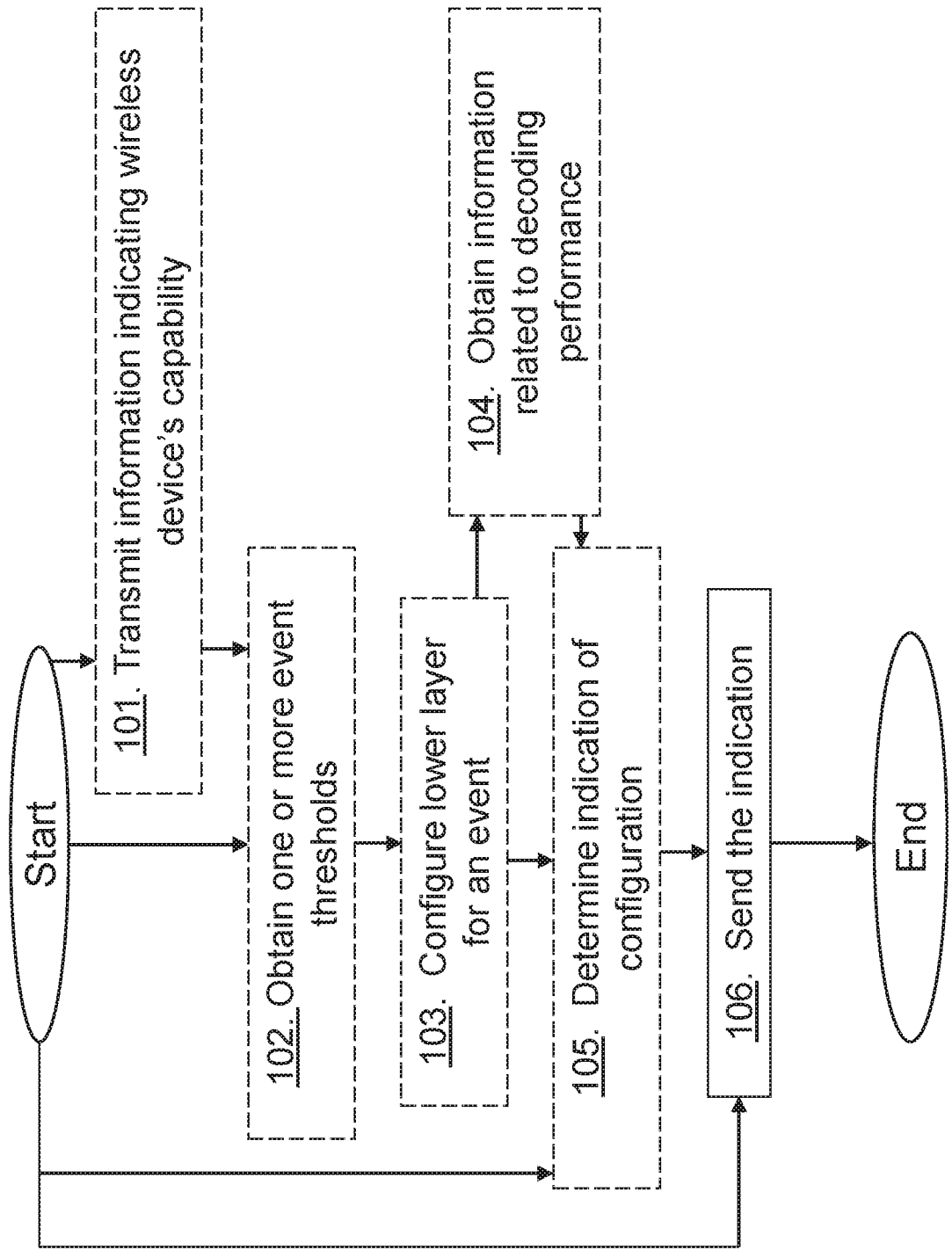
FIG. 1B is a schematic flowchart depicting a method performed by a wireless device according to embodiments herein.

The method actions performed by the wireless device for enabling the wireless device 10 to perform RLM of the first or serving cell 11 of the network node 12 in the wireless communication network 1 according to some embodiments will now be described with reference to a flowchart depicted in FIG. 1B. The actions do not have to be taken in the order stated below, but may be taken in any suitable order. Actions performed in some, but not necessarily all, embodiments are marked with dashed boxes.

Action 101. The wireless device 10 may transmit to the network node serving the wireless device 10, information indicating the wireless device's capability to support enhanced event monitoring, e.g. capability for detecting synchronization when being in an enhanced coverage level mode.

Action 102. The wireless device 10 may obtain one or more event thresholds used to trigger an event or used for triggering the event, from the network node 12. The event may be one or more or an early Qin and an early Qout.

Action 103. The wireless device 10 may configure lower layers, such as layer 1 or layer 2, for the event according to the obtained one or more event thresholds.

Action 104. The wireless device 10 may obtain information related to a decoding performance of the control channel. This may be based on historical decoding performance, i.e. whether, or to what degree, the decoding has been successful with a certain repetition level (number of repetitions) and/or aggregation level. These transmission parameters are variables and depend on the actual operational conditions, e.g. experienced Signal to Noise Ratio (SNR) levels and coverage mode or level.

Action 105. The wireless device 10 may determine the indication by determining a configuration comprising transmission parameters of the control channel, which transmission parameters comprise repetition level and/or aggregation level.

Action 106. The wireless device 10 sends to the network node an indication indicating at least one recommended repetition level and/or recommended aggregation level, of at least one radio signal and/or control channel. The indication may, according to some embodiments, have been determined by the wireless device 10 in an Action 105 performed prior to Action 106. The wireless device 10 may in one example determine the indication by determining a configuration comprising transmission parameters of the control channel, which transmission parameters comprise repetition level and/or aggregation level. The wireless device may further transmit one or more of: one or more event reports when one or more events are triggered by the wireless device based on the one or more event thresholds; power boosting of the control channel; and transmission format of the control channel. There is one event threshold for each event. For Early Qin, there is one event threshold. For Early Qout, there is another event threshold. The indication may be a single value indicating a increase or a decrease of the repetition level and/or aggregation level or may be a configuration comprising the recommended repetition level and/or recommended aggregation level related to the wireless device's coverage level.

Figure 1C:
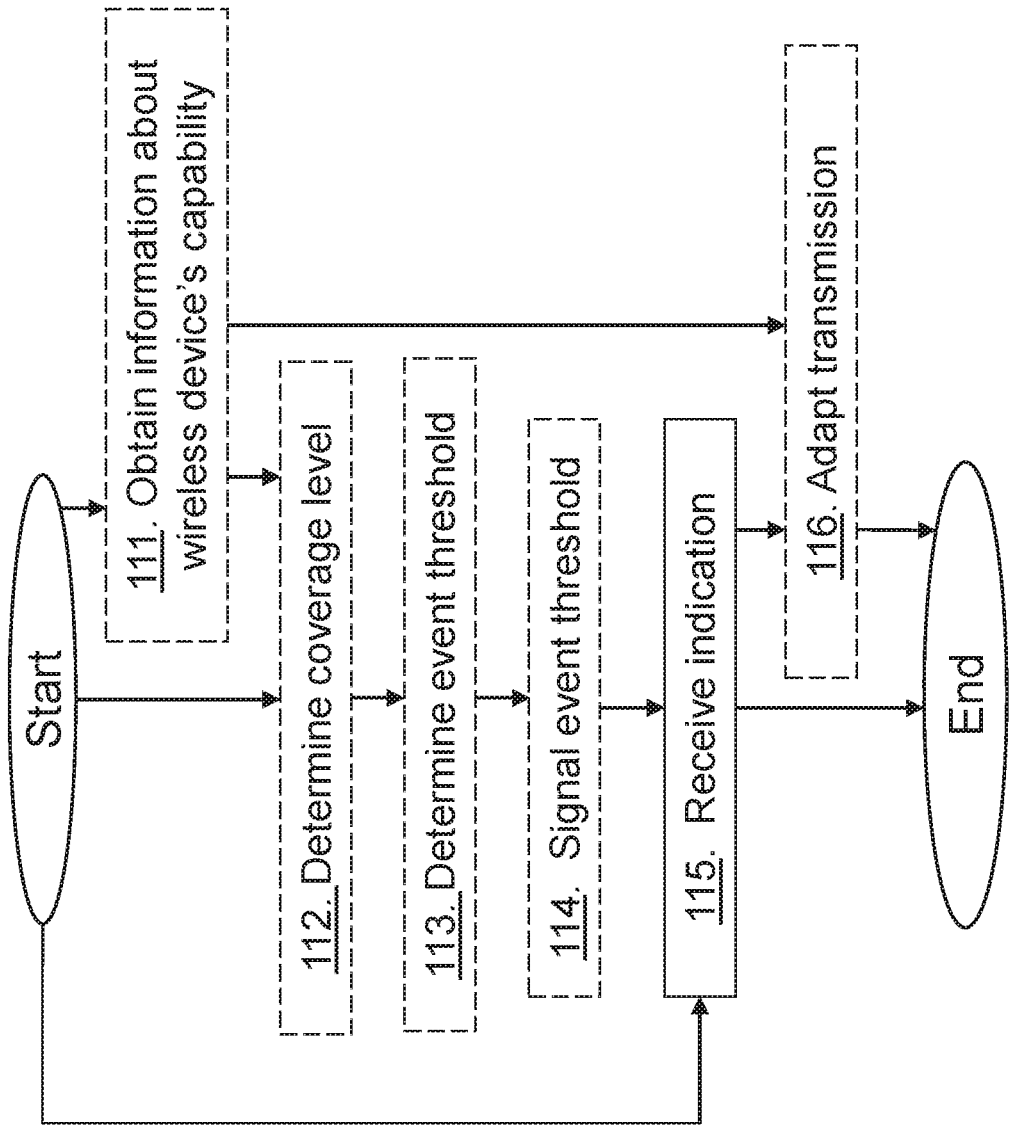
FIG. 1C is a schematic flowchart depicting a method performed by a network node according to embodiments herein.

The method actions performed by the network node 12 for enabling the wireless device 10 in the wireless communication network to perform RLM of the cell of the network node according to some embodiments will now be described with reference to a flowchart depicted in FIG. 1C. The actions do not have to be taken in the order stated below, but may be taken in any suitable order. Actions performed in some, but not necessarily all, embodiments are marked with dashed boxes.

Action 111. The network node 12 may obtain the information about wireless device's capability to support an enhanced event monitoring. The network node may obtain this information by receiving the information from the wireless device 10 or from another radio network node or by the information being stored at the network node 12.

Action 112. The network node 12 may determine the coverage level of the wireless device 10.

Action 113. The network node 12 may then, based on the determined coverage level, determine one or more event thresholds for triggering an event.

Action 114. The network node 12 may then signal, to the wireless device 10, the one or more event thresholds.

Action 115. The network node 12 receives from the wireless device 10, the indication indicating at least one recommended repetition level and/or recommended aggregation level, of at least one radio signal and/or control channel. The network node 12 may further receive one or more of: one or more event reports when one or more events are triggered by the wireless device based on the one or more event thresholds; power boosting of the control channel; and transmission format of the control channel.

Action 116. The network node 12 may then adapt the transmission of at least one radio signal and/or channel based on the at least one recommended repetition level and/or recommended aggregation level indicated by the received indication.

Figure 2A:
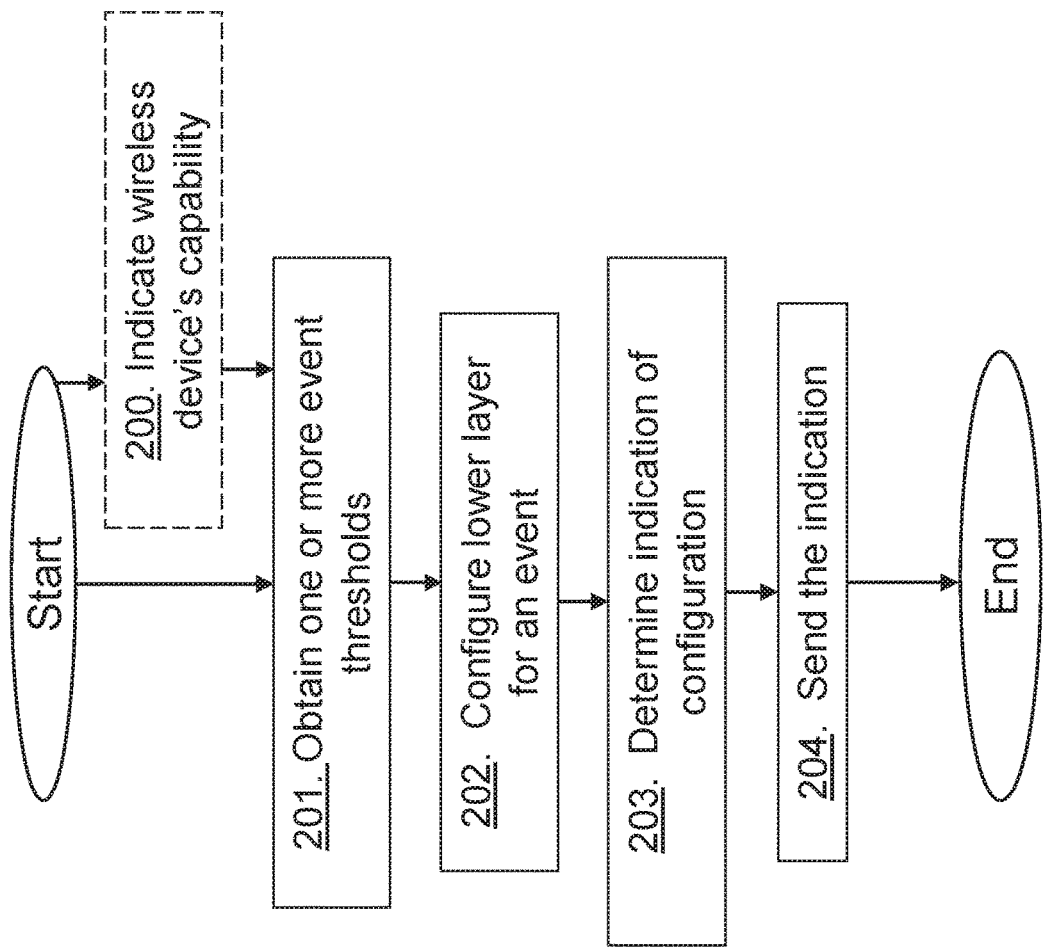
FIG. 2A is a schematic flowchart depicting a method performed by a wireless device according to embodiments herein.

The method actions according to some embodiments herein and performed by the wireless device for enabling the wireless device 10 in the wireless communication network 1 to perform RLM of the first cell 11 of the first network node 12 will now be described with reference to a flowchart depicted in FIG. 2A. The first cell may be a serving cell, or non-serving cell, etc.

Action 200. The wireless device 10 may in this example indicate to another node, e.g., serving network node, the wireless device's ability or capability to support enhanced event monitoring, wherein the enhanced event monitoring may be based on the embodiments described herein. The capability may be sent upon a request or in an unsolicited way or may be comprised in a more general capability, e.g., all wireless devices supporting the operation in enhanced coverage may have to support the enhanced event monitoring. This capability or capability information may be used by the receiving first network node 12, e.g., for configuring events.

Action 201. The wireless device 10 may further obtain one or more event thresholds, e.g., receiving one or more event thresholds, e.g. a SNR threshold used to trigger the event, from the serving first network node. For example, the wireless device 10 receives an event threshold from the serving network node 12. In some scenarios, the event threshold can also be received from other network nodes such as neighboring network nodes, core network node, third party node or even from a neighbor node such as the second network node 13.

Each event threshold may depend on the coverage level of the wireless device 10. There is one event threshold for each event that corresponds to one set of transmission parameters. Example principles and rules for determining the wireless device's coverage level are also provided below.

The event threshold is such that wireless device 10 may trigger an event when a measurement indicates that the wireless device 10 is X dB below the threshold. The intention is to trigger the event "X" dB from the actual out-of-sync or in-sync levels. Using these new event thresholds, the wireless device 10 would know when an out-of-sync or in-sync is going to be triggered long before it is going to happen. This time would depend on the value of X. This value can depend on several factors, such as e.g. operational scenario, the coverage enhancement level, a load in the wireless device, network capacity, operational scenario etc.

Action 202. The wireless device 10 may further configure the lower layers for, e.g. measuring and triggering, for the event (or one or more events) according to the thresholds received in action 201.

Action 203. The wireless device 10 determines a configuration comprising the transmission parameters of the control channels. For determining such configuration, the wireless device 10 may use information related to a control channel I, e.g. PDCCH, ePDCCH, MPDCCH, NPDCCH etc., and decoding performance; e.g. this can be based on historical decoding performance.

In a first embodiment, the wireless device 10 determines a configuration that is determined based on some predefined rules.

The configuration can be derived based on some mapping table that maps a measured value to a repetition level and aggregation level. An example is given below in Table 1. The mapping table (e.g. table 1) can be pre-defined or configured at the wireless device 10 by the first network node 12 or it can be combination of pre-defined parameters and configurable parameters. In yet another example a superset mapping table can be pre-defined. But the first network node 12 can reconfigure the wireless device 10 with a table, which is subset of the superset table. The wireless device 10 then uses the configured table for deriving the actual values and sends the associated index to the first network node 12.

This example table 1 contains an explicit mapping of value 'X', repetition level, and aggregation level and reported value. If an event is triggered at 'X'=0 dB, then the wireless device 10 would report index #0 along with the event report. Index #0 means the wireless device 10 is currently at the RLF triggering threshold (out-of-sync threshold). Similarly, the other values of 'X' would mean that the wireless device 10 is '1' dB, '2' dB, '3' dB etc. from the actual RLF (out of sync) threshold. The value of Aggregation level (AL) and Repetition level (RL) for the control channels should be such that it contains the highest values when 'X' is 0 and then decrease as 'X' increases. This means that when to wireless device 10 is very close to declaring RLF, it can take an aggressive approach to adapt its transmission parameters to quickly recover the link while these values can be a bit lower when the wireless device 10 is far from declaring RLF. A similar table could be maintained where instead of value 'X' that corresponds to the configured margin to Qout (out-of-sync) threshold, a Qin threshold is used instead.

TABLE 1

Example 1 where a single value is reported indicating Repetition level (RL) and Aggregation level (AL) based on 'X'

| Value of 'X' [dB] | Repetition level (RL) | Aggregation level (AL) | Reported Index |
|---|---|---|---|
| 0 | R0 | A0 | 0 |
| 1 | R1 | A1 | 1 |
| 2 | R2 | A2 | 2 |
| 4 | R3 | A3 | 3 |
| 6 | R4 | A4 | 4 |
| 8 | R5 | A5 | 5 |

The events can be summarized are follows:
Event M1 which is triggered when the wireless device 10 is 'X' dB below or above the Qout threshold depending on the configured value of 'X'
Event M2 which is triggered when the wireless device 10 is 'Y' dB below or above the Qin threshold depending on the configured value of 'Y',
1 The values of 'X' and 'Y' can be either positive or negative.

A second example is given in Table 2. This example contains two separate and independent mapping tables which are then combined into one reported value or one set of RL and AL.

This embodiment is assuming that the predefined mapping table is known to both the first network node 12 and the wireless device 10.

In this second embodiment, the configuration derived by the wireless device 10 comprises an index which is based on at least different type of signals, channels, operational conditions. Some non-limiting examples of such factors based on which the index is derived are:
SNR of reference signal measurements (e.g. CRS, NRS)
SNR of synchronization signals (e.g. PSS/SSS/NPSS/NSSS)
Coverage levels
Configured values for the new events such as an early Qin and an early Qout.
Any combination of these In RLM procedure the wireless device 10 performs measurements on downlink reference symbols to estimate downlink radio link quality e.g. SINR/SNR. This measurement is then used by the wireless device 10 to determine the hypothetical BLER of control channel (PDCCH taking into account PCFICH errors, MPDDCH, NPDDCH) by using a pre-defined mapping between the estimated quality (e.g. SINR levels) and the BLER of control channel. There are two thresholds associated with RLM procedure, namely Qout and Qin. These two thresholds refer to a certain target BLER: Qout corresponds to 10% target BLER of hypothetical PDCCH/MPDCCH/NPDCCH transmitting the DL data scheduling message, and Qin to 2% target BLER of hypothetical PDCCH/MPDDCH/NPDDCH transmitting the random access response or paging indication. The measured SINR/SNR value is not reported to the network node as it is only used for this mapping.

Since this SNR/SINR value is already available at the wireless device 10 it would be advantageous to use it to enhance monitoring of the wireless device 10. The SNR/SINR can be based on for example CRS, NRS, PSS/SSS/NPSS/NPSS, or even any combination of these signals. An example of such mapping table is given in Table 2. This can help the first network node 12 to adapt its transmission parameters accordingly and it does not introduce any new measurement or additional processing in the wireless device 10.

TABLE 2

SNR to reporting index mapping table

| Reported Index | Measured quantity value | Unit |
|---|---|---|
| 0 | $SNR \geq X1$ | dB |
| 2 | $X1 \leq SNR \leq X2$ | dB |
| 3 | $X2 \leq SNR \leq X3$ | dB |
| ... | ... | ... |

The wireless device 10 may determine a recommended configuration comprising one or more transmission parameters of at least physical signals and channels, e.g. MPDCCH or NPDCCH. According to some embodiments, the wireless device 10 may obtain information related to the control channel, e.g. PDCCH, ePDCCH, MPDCCH, NPDCCH etc., and decoding performance; e.g. this can be based on historical decoding performance. Two of the fundamental transmission parameters that control the MPDCCH/NPDCCH decoding performance are repetition level and aggregation level. These transmission parameters are variables in the specification and depends on the actual operational conditions, e.g. experienced SNR levels, coverage mode or level.

The wireless device 10 may determine a suitable set of repetition level (Rmax) and aggregation level (Lmax) and recommend that to the serving first network node 12. In e.g. legacy RLM procedure, no such recommendation of Rmax and Lmax is done by the wireless device 10 to the serving first network node 12. Instead, the entire RLM procedure is carried out by the wireless device 10 itself. The recommendation results in an enhanced monitoring compared to the legacy RLM procedure.

The configuration may comprise the recommended value in terms of relative updates of the repetition level or aggregation level in relation to currently configured value. For example, the wireless device 10 may indicate that the current MPDCCH/NPDCCH repetition level may be increased by N repetition levels or decreased by M repetition levels. The values of M and N may or may not be the same.

The possible repetition levels and aggregation levels that can be used are predefined in [3GPP TS36.213 V13.2.0]. In this case, the wireless device 10 may simply indicate one or more indices of the values in relation to currently used values. For example, if currently used repetition level is 32 and the wireless device 10 indicates an increase by 1 step, this would result in 64, and an increase by 2 indexes would result in 128. This way of indicating the desired levels can be used for any transmission parameters that are known and predefined, e.g. repetition levels and aggregation levels.

In other non-limiting examples, configuration determined by the wireless device 10 may comprise information on desired power-boosting levels. When the decoding performance is poor, e.g. BLER is ≥10%, and/or if the measured measurement indicated that it is actually in very bad coverage, or if it is explicitly signed by the first network node 12 or any other nodes that it is in Coverage enhancement (CE) level X, where X>0, etc., this wireless device 10 may indicate in the configuration that power boosting, e.g. of control channels, is needed.

In addition to indicating whether power-boosting is needed or not, the wireless device 10 may also indicate a desired level of power-boosting. In a first example, the wireless device 10 may indicate that it is X dB below desired level needed to reach the BLER target. In a second example, the wireless device 10 may provide relative updates, e.g. that the current power-boosting level should is increased by X1 dB, or current power-boosting level should be decreased by Y1 dB. X1 and Y1 may or may not be the same.

Since decoding performance of the control channel is known to the wireless device 10, from the information obtained by the wireless device 10 internally or externally, and the measured downlink measurements may be unreliable especially in enhanced coverage, the RLM performance can be significantly improved by having the wireless device 10 select suitable transmission parameters such as a set of Rmax, Lmax, power-boosting levels and recommend that to the serving network node 12.

As an example, the wireless device 10 could maintain a table with SNR to BLER mapping taking into account the repetition levels and aggregation levels. An example is given in Table 3.

under enhanced coverage. In this case, the wireless device 10 may even recommend more relaxed values of Rmax and Lmax since the operational scenario can be challenging.

In other cases where the wireless device 10 is operating under good or normal coverage, the determined values of Rmax and Lmax may depend on the measured value. Since it is operating under normal coverage, it can be reasonable to assume that the measured value is subject to more reliable value. Then the wireless device chooses the transmission parameter, such as Rmax and Lmax, based on both historical control channel decoding performance and the measured value.

Although the principles above are exemplified in the context of RLM and MPDCCH, it shall be noted that the same principle could be used for any transmission signals and/or channels.

According to embodiments, the received event-threshold from the network node 12 may be such that it triggers the event when the wireless device 10 moves from a higher CE level area, e.g. bad coverage, enhanced coverage, to a lower

TABLE 3

MPDCCH decoding performance with respect to Rmax and Lmax
Qin/Qout in terms of MPDCCH BLER with CE Mode B configuration under ETU1

| | Lmax = 4 | | | | Lmax = 16 | | | |
| --- | --- | --- | --- | --- | --- | --- | --- | --- |
| SNR (dB) | Rmax = 32 | Rmax = 64 | Rmax = 128 | Rmax = 256 | Rmax = 32 | Rmax = 64 | Rmax = 128 | Rmax = 256 |
| −20.00 | 0.99 | 0.96 | 0.92 | 0.79 | 0.81 | 0.66 | 0.47 | 0.22 |
| −19.00 | 0.99 | 0.94 | 0.84 | 0.67 | 0.72 | 0.55 | 0.34 | 0.15 |
| −18.00 | 0.97 | 0.89 | 0.73 | 0.50 | 0.63 | 0.43 | 0.22 | 0.09 |
| −17.00 | 0.94 | 0.80 | 0.65 | 0.40 | 0.49 | 0.29 | 0.15 | 0.04 |
| −16.00 | 0.86 | 0.71 | 0.46 | 0.28 | 0.35 | 0.21 | 0.09 | 0.02 |
| −15.00 | 0.76 | 0.61 | 0.34 | 0.15 | 0.24 | 0.13 | 0.06 | 0.01 |
| −14.00 | 0.66 | 0.46 | 0.26 | 0.08 | 0.18 | 0.07 | 0.02 | 0.00 |
| −13.00 | 0.56 | 0.35 | 0.18 | 0.04 | 0.12 | 0.04 | 0.01 | 0.00 |
| −12.00 | 0.40 | 0.24 | 0.10 | 0.02 | 0.05 | 0.03 | 0.01 | 0.00 |
| −11.00 | 0.29 | 0.15 | 0.05 | 0.01 | 0.03 | 0.01 | 0.00 | 0.00 |
| −10.00 | 0.20 | 0.08 | 0.01 | 0.00 | 0.02 | 0.01 | 0.00 | 0.00 |
| −9.00 | 0.12 | 0.05 | 0.01 | 0.00 | 0.01 | 0.00 | 0.00 | 0.00 |
| −8.00 | 0.07 | 0.02 | 0.01 | 0.00 | 0.01 | 0.00 | 0.00 | 0.00 |
| −7.00 | 0.03 | 0.01 | 0.00 | 0.00 | 0.00 | 0.00 | 0.00 | 0.00 |
| −6.00 | 0.02 | 0.01 | 0.00 | 0.00 | 0.00 | 0.00 | 0.00 | 0.00 |
| −5.00 | 0.02 | 0.00 | 0.00 | 0.00 | 0.00 | 0.00 | 0.00 | 0.00 |
| −4.00 | 0.01 | 0.00 | 0.00 | 0.00 | 0.00 | 0.00 | 0.00 | 0.00 |
| −3.00 | 0.00 | 0.00 | 0.00 | 0.00 | 0.00 | 0.00 | 0.00 | 0.00 |
| −2.00 | 0.00 | 0.00 | 0.00 | 0.00 | 0.00 | 0.00 | 0.00 | 0.00 |
| −1.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 |

From such table 3, the wireless device 10 knows under what repetition level and aggregation level the decoding performance is good, e.g. BLER below 2% or bad e.g. above 10%. The wireless device 10 can recommend a set of Rmax and Lmax under which the BLER is below 2%. The recommended values of Rmax and Lmax can be based on:
Last MPDCCH decoding performance
Averaged MPDCCH decoding performance over the last T1 seconds
Averaged over all MPDCCH decoding performance
Rmax and Lmax that results in minimum BLER
Configured by other nodes, e.g. SON node, core network node, third-party node, signaled from other UEs in its proximity, etc.

In some examples, the determined set of Rmax and Lmax may be independent of the measured value, e.g. at enhanced coverage. In such cases, the determined values of Rmax and Lmax may be entirely based on its historical control channel performance since the measurement accuracy may be poor CE level area, e.g. relatively good coverage, normal coverage. In this case, the event can be triggered when the wireless device 10 goes from being operating at control channel BLER 2% to BLER being<2%. This can be interpreted as the wireless device 10 is moving from being out-of-sync to in-sync. The configuration derived by the wireless device 10 can be similar to those described above, but in opposite direction, i.e. instead of increasing the desired resources they are reduced instead. More specifically, the resources assigned/used for transmissions can be reduced since evaluations show that the wireless device 10 is moving into good coverage, i.e. the Lmax/Rmax and all other transmission parameters can be adapted so that the amount of resources used for transmissions are reduced.

The time at which the event is detected will depend on the configured threshold value. In practice, this means that the earlier the event is detected, the more resources can be saved in the first network node 12. Therefore it is highly advantageous if the wireless device 10 can detect the event and provide a suitable recommendation of transmission parameters comprising aggregation level and/or repetition level, and may further provide power boosting level, transmission format, etc., as early as possible. The repetitions are generally very costly for the network, and thus reducing the resources as soon as they are not necessary can save resources.

In order to detect and determine suitable configuration, e.g. comprising transmission parameters, the wireless device 10 may use available information on location/mobility profile and/or other positioning measurement to decide whether or not the wireless device 10 is moving towards a good coverage area and vice versa.

Action 204. The wireless device 10 sends or transmits to the serving network node 12 the configuration, e.g., preferred or recommended, in terms of the indication. For example, the wireless device may signal the determined configuration in terms of the index. The reported index corresponds to the recommended values of RL and AL to be used by the first network node 12 for transmitting e.g. downlink control channel. The indication may indicate a configuration, e.g., preferred or recommended, comprising at least one of the recommended repetition level and/or recommended aggregation level, of at least one radio signal and/or channel, e.g., the control channel, wherein the recommended repetition level and/or recommended aggregation level is related to a coverage level. In this action 204, the wireless device 10 may send a recommended configuration to the serving network node 12 or signal the determined set of repetition level (Rmax) and aggregation level (Lmax) along with the RLM event triggered measurement to the serving network node 12.

Figure 2B:
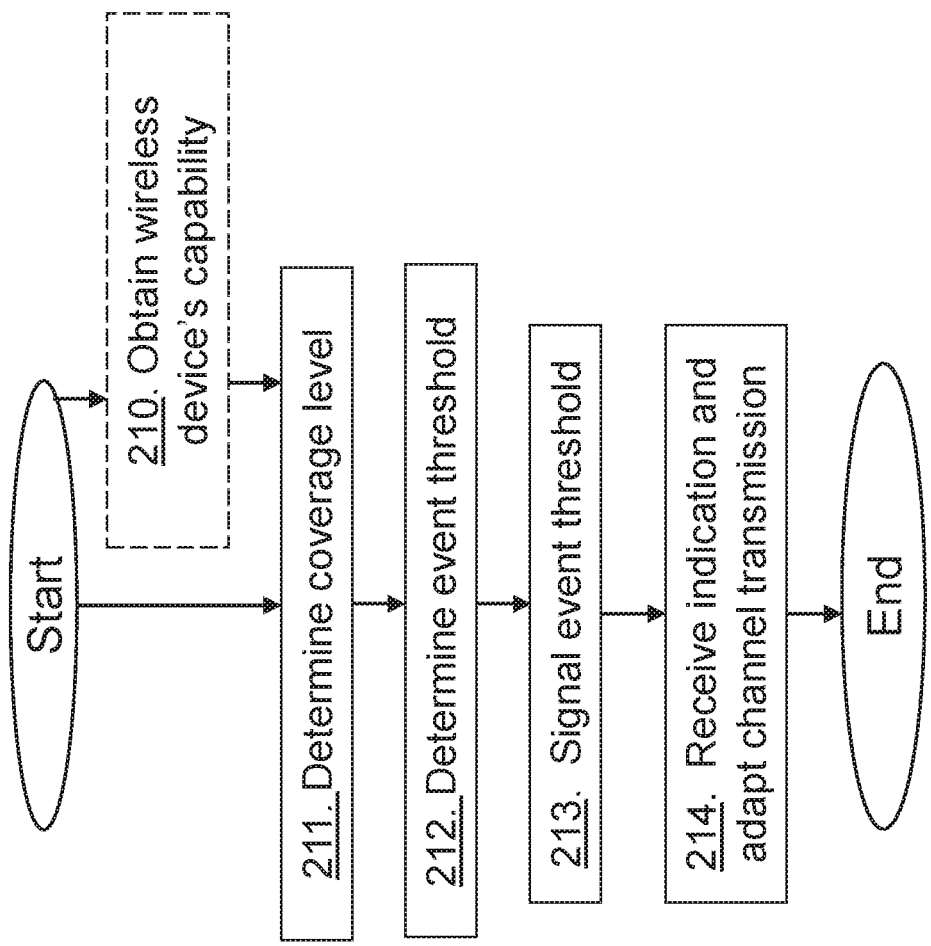
FIG. 2B is a schematic flowchart depicting a method performed by a first network node according to embodiments herein.

The method actions according to some embodiments and performed by the first or serving network node 12 for enabling the wireless device 10 in the wireless communication network 1 to perform RLM of the first or serving cell 11 of the first or serving network node 12 will now be described with reference to a flowchart depicted in FIG. 2B. The actions do not have to be taken in the order stated below, but may be taken in any suitable order. Actions performed in some, but not necessarily all, embodiments are marked with dashed boxes.

The procedure may be exemplified as follows:

Action 210. The first network node 12 may obtain the information about the wireless device's ability to support enhanced event monitoring. The obtaining may be based e.g. on one or more of: a message or indication received from another node (e.g., the wireless device 10 or another network node), history, measurements, pre-defined rules, etc. The obtained capability information may be used by the first network node, e.g., for configuring events for the wireless device 10. For example, the events may be configured differently for wireless devices with and without such capability. The first network node 12 may obtain that the wireless device 10 is capable of operating under enhanced coverage and is performing or is expected to perform radio link monitoring of the serving cell 11. This may be determined at the first network node 12 based on information that may be obtained from within the first network node 12 or from a different network node. This may also be determined at a different network node and sent to the first network node 12.

Action 211. The first network node 12 determines coverage level of the wireless device 10. The first network node 12 may determine the coverage level of the wireless device 10 based on one or more of the following data:
radio measurement results;
mobility profile of the wireless device;
location information of the wireless device;
capability of the wireless device.

For example, the first network node 12 may receive the coverage information, e.g. CEModeA, CEModeB, from a neighbor node, core network node, SON node, or any other third party node.

The first network node 12 may determine which one or more of its connected wireless devices, i.e. wireless devices served by the first network node 12, are operating in or expected to operate in or with enhanced coverage. This may be determined as follows. The first network node 12 indicates in its broadcast information that it supports enhanced coverage operation. All receiving wireless devices in the first cell 11 are then required to respond to that request accordingly. The wireless device 10 may send a Random Access Channel (RACH) request using the information provided in the broadcast channel and by that the first network node 12 becomes aware that this particular wireless device 10 requires service under enhanced coverage. All wireless devices determined to be operating under enhanced coverage in the first action 211 may perform radio link monitoring as it is a fundamental procedure to maintain for RRC_CONNECTED state. It is by using RLM procedure that the wireless device 10 detects whether it is in in-sync or out-of-sync with the serving cell.

The first network node 12 may also perform one or more radio measurements on signals transmitted by the wireless device 10 to determine the coverage level e.g. UL SINR, UL signal strength etc. The first network node 12 may also combine the DL measurements performed by the wireless device 10 and the UL measurements performed by the first network node 12 to more accurately determine the coverage level with regards to the serving cell and/or with regards to at least one neighbor cell.

The first network node 12 may also observe the mobility profile of the wireless device 12 to determine the coverage of the wireless device 10 in an area. The mobility profile of the wireless device 10 is characterized by one or more of: speed or velocity of the wireless device 10 such as Doppler speed, direction of movement of the wireless device 10, acceleration of the wireless device 10, trajectory of the wireless device 10 etc. For example based on direction of motion and speed of the wireless device 10 the first network node 12 may predict the coverage of the wireless device 10 at a certain time in future. The first network node 12 may determine the mobility profile of the wireless device 10 by measuring UL signals of the wireless device 10.

The first network node may also obtain information on the location of the UE or wireless device and use this to determine the UE coverage or the coverage level under which the wireless device operates in the area. The location of the UE or wireless device can be determined based on one or a combination of location methods such as Global Navigation Satellite Systems (GNSS) or Assisted-GNSS, enhanced cell ID, time of arrival (TOA) of signals, Observed Time Difference of Arrival (OTDOA) etc. The wireless device location may also be obtained by paging the wireless device 10, e.g., when it is in IDLE state. The location information may comprise a geographical and/or logical location, e.g., location coordinates, UE proximity to an object with a known location, UE location in a cell or in a cell portion, location within a tracking area, etc.

The first network node 12 may also obtain the wireless device capability information which indicates whether the wireless device is capable of operating, i.e. receiving and/or transmitting signals, under enhanced coverage e.g. SINR<−6 dB. The wireless device capability information can be obtained from the wireless device 10 and/or from another network node which contains the wireless device capability. For example if the wireless device capability information indicates that the wireless device 10 is capable of operating under enhanced coverage and the wireless device is also physically operating under enhanced coverage (e.g. at a SINR level applicable for enhanced coverage such as SINR=−10 dB) then the first network node may consider that the wireless device 10 is actually operating in enhanced coverage.

The first network node 12 may also continuously or regularly monitor the coverage level of the wireless device 10 in the area by using one or more criteria mentioned above. This enables the first network node 12 to know any change in the coverage level of the wireless device 10 in the area e.g. with respect to the first network node 12 and/or with respect to at least one second network node.

Action 212. The first network node 12 may then determine an event threshold, based on the determined coverage level of the wireless device 10. This event threshold is then signaled to the wireless device 10.

For example. the first network node 12 may determine the event threshold based on the determined coverage level information and signal the wireless device 10 this event threshold. The network node 12 may configure an event that is triggered 'X' dB before RLF levels. The coverage level of the wireless device 10 may also be taken into account to define such event level. The coverage level can be reflected on the chosen values of 'X'. This value of X may depend on several factors, such as e.g. operational scenario, the coverage enhancement level, the load in the wireless device 10, network capacity, operational scenario etc. For example, if the determined coverage level shows that the wireless device 10 is operating in normal coverage, e.g. without any repetitions, then the value of 'X' may even be 0. On the other hand, if the determined coverage level shows that the wireless device 10 is operating under enhanced coverage, then the network node may configure the value of 'X' to be quite large, e.g. 4 dB. This would allow the network node 12 some time to be able to try to recover the link and preventing the wireless device 10 from declaring RLF.

The first network node 12 may further configure a table with one or more parameters used in a mapping table that maps a measured value of signal quality to a repetition level and aggregation level. An example of such table is shown in Table 1 above. In yet another example a subset of table 1 is configured at the wireless device 10 by the first network node 12. This is shown in table 4 and table 5. The subset is derived by the first network node 12 based on for example the coverage level of the wireless device 10. The aim of the subset is to enable the wireless device 10 to provide the recommended index of the set of RL and AL with higher accuracy. This approach also reduces a complexity and power consumption of the wireless device.

In table 4 the first network node 12 uses only lower values of X. This can be used if the coverage level of the wireless device 10 is normal or moderate (e.g. SNR>−8 dB).

TABLE 4

A single value (index) is reported by the wireless device indicating RL and AL based on 'X', which are subset of values in table 1.

| Value of 'X' [dB] | Repetition level (RL) | Aggregation level (AL) | Reported Index |
|---|---|---|---|
| 0 | R0 | A0 | 0 |
| 1 | R1 | A1 | 1 |

TABLE 4-continued

A single value (index) is reported by the wireless device indicating RL and AL based on 'X', which are subset of values in table 1.

| Value of 'X' [dB] | Repetition level (RL) | Aggregation level (AL) | Reported Index |
|---|---|---|---|
| 2 | R2 | A2 | 2 |
| 4 | R3 | A3 | 3 |

In table 5 the first network node 12 uses only larger values of X. This can be used if the coverage level of the wireless device 10 is enhanced (e.g. SNR≤−8 dB).

TABLE 5

A single value (index) is reported by the wireless device 10 indicating RL and AL based on 'X', which are subset of values in table 1.

| Value of 'X' [dB] | Repetition level (RL) | Aggregation level (AL) | Reported Index |
|---|---|---|---|
| 4 | R3 | A3 | 3 |
| 6 | R4 | A4 | 4 |
| 8 | R5 | A5 | 5 |

Similar tables (Table 4 and Table 5) could be maintained by the first network node 12 that instead depends on the value of 'Y' that corresponds to the margin to Qin (in-sync) threshold. The values of 'X' and 'Y' can be either positive or negative depending on the network configuration.

The events can be summarized as follows:
Event M1 which is triggered when the wireless device 10 is 'X' dB below or above the Qout threshold depending on the configured value of 'X'
Event M2 which is triggered when the wireless device 10 is 'Y' dB below or above the Qin threshold depending on the configured value of 'Y',
The values of 'X' and 'Y' can be either positive or negative Action 213. The first network node 12 then signals the wireless device 10 with the determined event threshold. The first network node 12 may e.g. send the actual values or indices indicating the event threshold.

Action 214. The first network node 12 then adapts the channel e.g. the control channel, transmission according to received indication or indications from the wireless device 10.

The first network node 12 may adapt the transmissions according to received recommendation from the wireless device 10.

Examples of transmissions are physical signals, e.g. narrowband reference signal (NRS,) or CRS, physical channels, e.g. MPDCCH, NPDCCH, the wireless device 10 may for example:
Increase/decrease the levels of currently used transmission parameters according to received indication.
Make increase/decrease (relative updates) in relation to currently used transmission parameters based received indication.

Since the first network node 12 may have some additional information related to the operational scenario of this particular wireless device, e.g. received from neighbor nodes, Self-Organizing Network (SON) nodes, core network node, or any other third-party nodes, the first network node 12 may make some further adaptation of the control channel in addition the received recommended value.

For example, the first network node 12 may also take into account other reported values such as Reference Signal Received power (RSRP), RS-SINR, Sounding Reference Signal (SRS), Channel Quality Indicator (CQI) etc. This can be combined with the RLM specific reported event to further improve the selection of RL and AL when the wireless device is in deep enhanced coverage, wherein the SNR is very low, where the measurement is not possible to rely on. For example, the first network node 12 may take an averaged value over the existing measurements and SINR/SNR which corresponds to the reported index in scenarios where the wireless device 10 is expected to be operating under bad coverage.

The first network node 12 can maintain a table with received reported index, e.g. as in Table 2, the transmission parameters and/or the configured thresholds for the enhanced measurement report triggering (Y value or X value depending on whether the wireless device 10 is moving closer to in-sync or to out-of-sync) used in the first network node 12. Such table can be maintained at least per physical channel, per type of physical signals etc. An example of such table is shown in Table 6. The first network node 12 can find out the mapping between the transmission parameters and the reported index that corresponds to the experienced SINR/SNR at the wireless device 10. The first network node 12 can use this information to adapt the transmission parameters. Adapting can be done in small e.g. incremental small steps or done in big steps when the reported index changes quickly or jumps from one value to another value where the jump between the values is large, e.g. at fading dips. The adaptation may contain any changes in the transmission parameters, some non-limiting examples are:

Repetition level

Aggregation level

Power-boosting level

Transmit power

DCI format

Number of OFDM symbols

TABLE 6

Example of mapping between reported index and transmission parameter values in the network node

| Reported Index | NPDDCH transmission parameters | | PDSCH transmission parameters | | New event-triggering threshold (X) when moving from a lower CE level to a higher one | New event-triggering threshold (Y) when moving from a higher CE level to a lower one |
|---|---|---|---|---|---|---|
| | Parameter | Value | Parameter | Value | | |
| 0 | RL | x | RL | x | X1 | Y1 |
| | AL | y | AL | y | | |
| | Power boosting | z | Power boosting | z | | |
| | Transmission format | n | Transmission format | n | | |
| 1 | RL | x | RL | x | X2 | Y2 |
| | AL | y | AL | y | | |
| | Power boosting | z | Power boosting | z | | |
| | Transmission format | n | Transmission format | n | | |
| 2 | ... | | ... | | ... | ... |
| 3 | ... | | ... | | ... | ... |

AS an example, the set of repetition level Rmax' and aggregation level Lmax' derived by the serving first network node 12 may or may not be the same as the set indicated by the wireless device 10 (Rmax and Lmax). In good channel conditions Rmax' and Lmax' may be very similar while in e.g. deep enhanced coverage the difference could be bigger.

The first network node 12 may also adapt the threshold values (e.g. X and Y depending on in-sync related event or out-of-sync related event) based on the received indication from the wireless device 10. For example, if the difference between network determined Rmax' and Lmax' and wireless device recommended Rmax and Lmax is large, e.g. greater than a certain threshold (|Rmax'−Rmax|≥threshold1 and/or |Lmax'−Lmax|≥threshold2), then the first network node 12 may configure a large value for 'X' when the wireless device 10 is moving from a good coverage area to a bad coverage area. The larger value of 'X' will allow the network node more margin to recover the wireless device back to in-sync. Likewise, a larger value of the 'Y' could result in that the wireless device 10 can quickly detect and adapt the transmission parameters, e.g. reduce the resources, when the wireless device is moving into a better coverage area.

Current requirements in the specification specify the minimum requirements. But the wireless devices in the field may be able to perform measurement with much better accuracy than what is specified in the specification. Thus the minimum requirements become quite useless for the first network node 12 since it can operate and meet the requirements using less amount of resources which is now possible with the recommended configuration indicated by the wireless device 10 along with the event report.

According to an aspect the object is achieved by providing a method performed by a first network node for enabling a wireless device in a wireless communication network to perform RLM of a first cell of the first network node.

The method comprises:

(optional): Obtaining, e.g., receiving from the wireless device, the information about wireless device's ability to support enhanced event monitoring Determining the coverage level of the wireless device;

Based on determined coverage level, network node determines and signals to the wireless device one or more event thresholds;

Receiving from the wireless device an indication related to a configuration comprising at least one transmission parameter with respect to the wireless device's coverage level and adapting the transmission of at least one radio signal and/or channel, e.g., control channel, based on the received indication.

According to another aspect the object is achieved by providing a method performed by a wireless device for enabling the wireless device to perform RLM of a first cell of a first network node in a wireless communication network.

The method comprises:
(optional): Indicating to another node, e.g., first radio network node serving the wireless device, the wireless device's ability to support enhanced event monitoring
Obtaining one or more event thresholds, e.g., receiving one or more event thresholds, e.g. SNR threshold used to trigger the event, from the serving network node, e.g. serving eNodeB;
Configuring the lower layers for the event according to the obtained one or more event thresholds;
Determining an indication related to a configuration comprising one or more transmission parameters of a control channel;
Sending to the serving network node the indication, e.g., preferred or recommended configuration, comprising at least one transmission parameter, e.g. a recommended repetition level and/or an aggregation level, of at least one radio signal and/or channel, e.g., control channel, wherein the at least one transmission parameter is related to a coverage level.

To perform the methods herein a wireless device and a first network node are provided. Hence, it is herein provided a first network node for enabling a wireless device in a wireless communication network to perform RLM of a first cell of the first network node.

Furthermore, it is herein provided a wireless device for enabling the wireless device to perform RLM of a first cell of a first network node in a wireless communication network.

Figure 3:
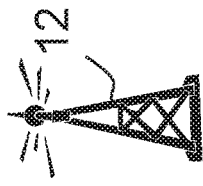
FIG. 3 is a block diagram depicting a wireless device according to embodiments herein.
Figure 3:
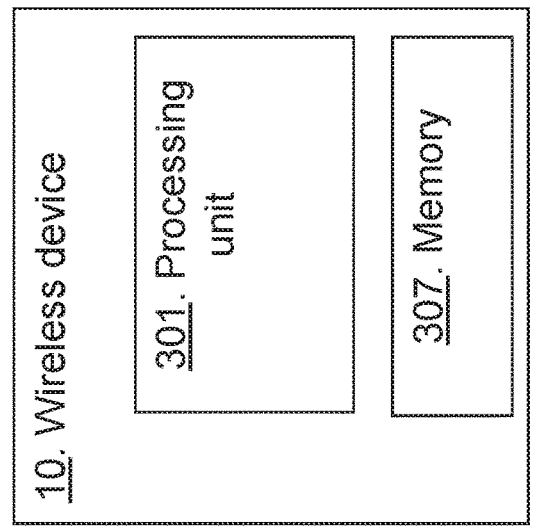
Figure 3:
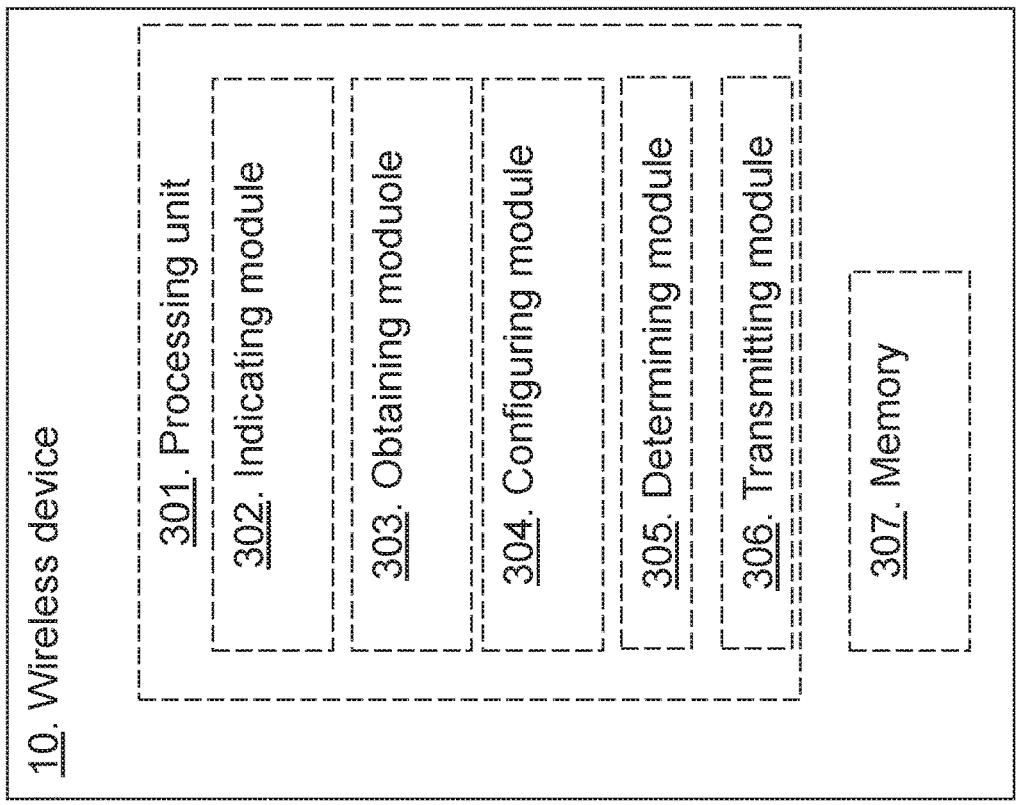
Figure 3:
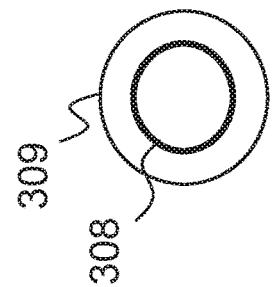

In order to perform the methods herein the wireless device 10 is provided. FIG. 3 is a block diagram depicting the wireless device 10 for enabling RLM of the cell of the network node 12 in the wireless communication network, e.g. for enabling the wireless device 10 in the wireless communication network 1 to perform RLM of the first cell 11 or a radio link of the first cell of the first network node 12. The wireless device 10 may comprise processing unit 301, such as one or more processors, to perform the methods disclosed herein.

The wireless device 10 may comprise an indicating module 302. The wireless device 10, the processing unit 301, and/or the indicating module 302 may be configured to transmit to the network node serving the wireless device, information indicating the wireless device's capability to support enhanced event monitoring, e.g. indicate to another node, e.g., first radio network node 12 serving the wireless device 10, the wireless device's ability to support enhanced event monitoring.

The wireless device 10 may comprise an obtaining module 303. The wireless device 10, the processing unit 301, and/or the obtaining module 303 may be configured to obtain one or more event thresholds, e.g., receiving one or more event thresholds, e.g. a Signal to Noise Ratio (SNR) threshold, used to trigger the event, from the network node 12, e.g. serving radio base station.

The wireless device 10 may comprise a configuring module 304. The wireless device 10, the processing unit 301, and/or the configuring module 304 may be configured to configure the lower layers for the event or the one or more events according to the obtained one or more event thresholds. The wireless device 10, the processing unit 301, and/or the configuring module 304 may further be configured to obtain information related to the decoding performance of the control channel.

The wireless device 10 may comprise a determining module 305. The wireless device 10, the processing unit 301, and/or the determining module 305 may be configured to determine the indication by determining a configuration comprising transmission parameters of the control channel, which transmissions parameters comprise repetition level and/or aggregation level. The wireless device 10, the processing unit 301, and/or the determining module 305 may thus be configured to determine the indication related to the configuration comprising one or more transmission parameters of a control channel.

The wireless device 10 may comprise a transmitting module 306. The wireless device 10, the processing unit 301, and/or the transmitting module 306 is configured to transmit or send to the network node 12 serving the wireless device, the indication indicating at least one recommended repetition level and/or a recommended aggregation level, of at least one radio signal and/or control channel, i.e. send to the serving network node 12 the indication. The wireless device 10, the processing unit 301, and/or the transmitting module 306 may further be configured to transmit one or more of:
one or more event reports when one or more events are triggered by the wireless device based on the one or more event thresholds;
power boosting of the control channel; and
transmission format of the control channel.

The wireless device 10 further comprises a memory 307. The memory comprises one or more units to be used to store data on, such as wireless device capability, SNR, SINR, link quality, event thresholds, repetition levels, coverage enhancement levels, applications to perform the methods disclosed herein when being executed, and similar.

The methods according to the embodiments described herein for the wireless device 10 may be respectively implemented by means of e.g. a computer program 308 or a computer program product, comprising instructions, i.e., software code portions, which, when executed on at least one processor, cause the at least one processor to carry out the actions described herein, as performed by the wireless device 10. The computer program 308 may be stored on a computer-readable storage medium 309, e.g. a disc or similar. The computer-readable storage medium 309, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 4:
FIG. 4 is a block diagram depicting a network node according to embodiments herein.
Figure 4:
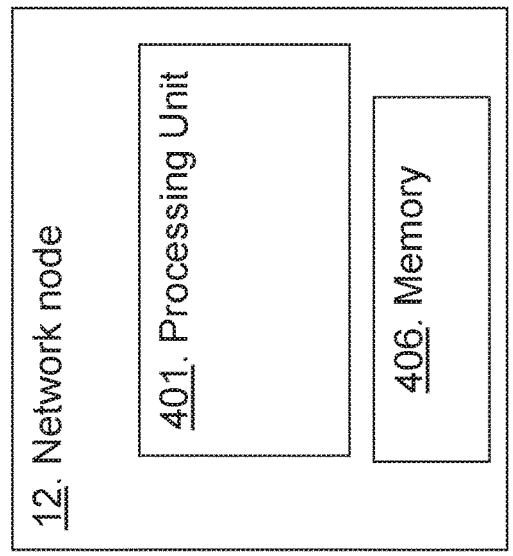
Figure 4:
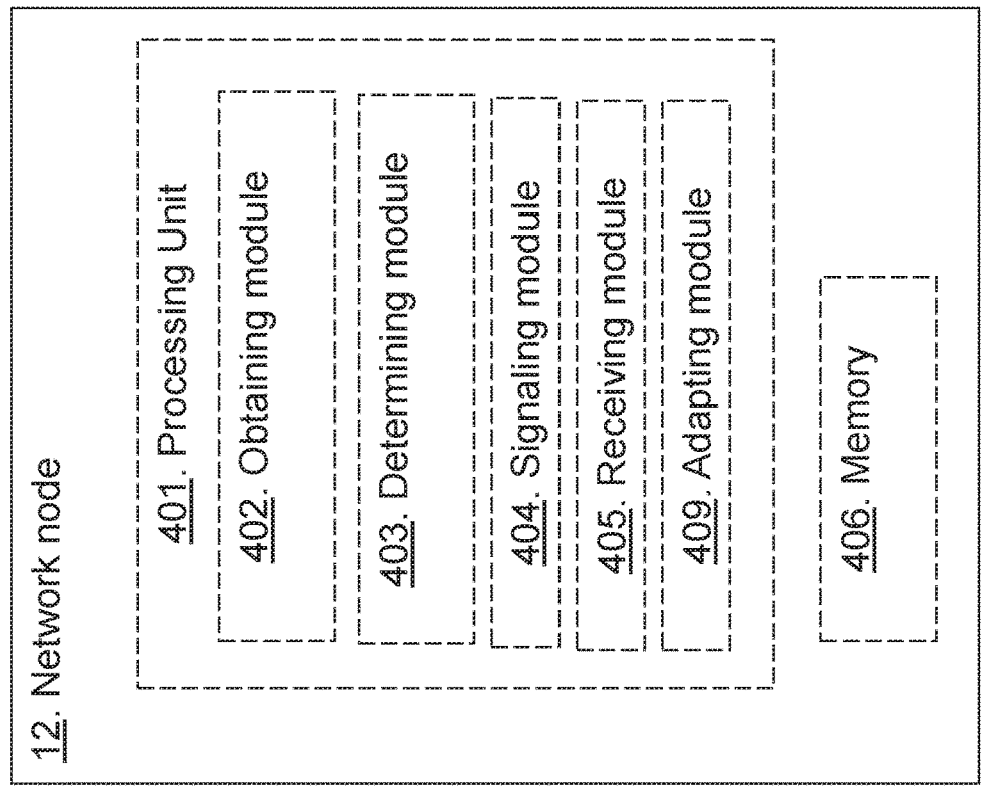
Figure 4:
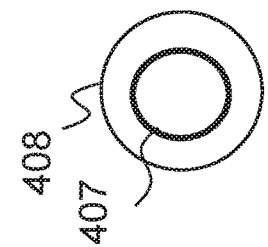

In order to perform the methods herein the network node 12 is provided. FIG. 4 is a block diagram depicting the network node 12, also referred to as the first network node 12, for enabling a wireless device 10 in the wireless communication network to perform RLM of the cell of the network node 12, e.g. for enabling the wireless device to perform RLM in the first cell of the first network node 12.

The network node 12 may comprise processing unit 401, e.g. one or more processors, to perform the methods disclosed herein.

The network node 12 may comprise an obtaining module 402. The network node 12, the processing unit 401, and/or the obtaining module 402 may be configured to obtain, e.g. to receive from the wireless device 10, the information about wireless device's capability to support enhanced event monitoring.

The network node 12 may comprise a determining module 403. The network node 12, the processing unit 401, and/or the determining module 403 may be configured to determine the coverage level of the wireless device 10. The network node 12, the processing unit 401, and/or the determining module 403 may further be configured to determine, based on determined coverage level, one or more event thresholds.

The network node 12 may comprise a signaling module 404. The network node 12, the processing unit 401, and/or the signaling module 404 may be configured to signal, to the wireless device 10, the one or more event thresholds. Thus, the network node 12, the processing unit 401, and/or the signaling module 404 may be configured to, based on determined coverage level, determine and signal to the wireless device 10 one or more event thresholds.

The network node 12 may comprise a receiving module 405, e.g. a receiver or transceiver. The network node 12, the processing unit 401, and/or the receiving module 405 is configured to receive from the wireless device 10, the indication indicating the at least one recommended repetition level and/or recommended aggregation level, of the at least one radio signal and/or control channel. The network node 12, the processing unit 401, and/or the receiving module 405 may be configured to receive, from the wireless device 10, the indication related to the configuration comprising at least one transmission parameter with respect to the wireless device's coverage level, and to adapt the transmission of at least one radio signal and/or channel, e.g., control channel, based on the received indication. The network node 12, the processing unit 401, and/or the receiving module 405 may be configured to further receive one or more of:
  one or more event reports when one or more events are triggered by the wireless device based on the one or more event thresholds;
  power boosting of the control channel; and
  transmission format of the control channel.

The network node 12 may comprise an adapting module 409. The network node 12, the processing unit 401, and/or the adapting module 409 may be configured to adapt the transmission of at least one radio signal and/or channel based on the at least one recommended repetition level and/or recommended aggregation level indicated by the received indication.

The network node 12 further comprises a memory 406. The memory comprises one or more units to be used to store data on, such as wireless device capability, SNR, SINR, link quality, event thresholds, repetition levels, coverage enhancement levels, applications to perform the methods disclosed herein when being executed, and similar.

The methods according to the embodiments described herein for the network node 12 may be respectively implemented by means of e.g. a computer program 407 or a computer program product, comprising instructions, i.e., software code portions, which, when executed on at least one processor, cause the at least one processor to carry out the actions described herein, as performed by the network node 12. The computer program 407 may be stored on a computer-readable storage medium 408, e.g. a disc or similar. The computer-readable storage medium 408, having stored thereon the computer program, may comprise the instructions which, when executed on at least one processor, cause the at least one processor to carry out the actions described herein, as performed by the network node 12. In some embodiments, the computer-readable storage medium may be a non-transitory computer-readable storage medium.

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

Any two or more embodiments described herein may be combined in any way with each other.

In some embodiments a non-limiting term UE or wireless device are used interchangeably. The UE herein can be any type of wireless device capable of communicating with network node or another UE via radio signals. The UE may also be radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipment (LEE), laptop mounted equipment (LME), USB dongles, Customer Premises Equipment (CPE) etc.

Also in some embodiments, generic terminology, "radio network node", is used. It can be any kind of a radio network node which may comprise any of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

In some embodiments the UE may be configured with PCell and PSCell or with PCell, PSCell and one or more SCells such as in dual connectivity. The configured cells are UE specific aka serving cells of the UE.

There may be one or more UEs in a cell. The embodiments are applicable for a UE in a high activity state e.g. RRC_CONNECTED state, active mode etc.

The UE may operate under either normal coverage or enhanced coverage with respect to its serving cell. The enhanced coverage is also interchangeably called as extended coverage. The UE may also operate in plurality of coverage levels e.g. normal coverage, enhanced coverage level 1, enhanced coverage level 2, enhanced coverage level 3 and so on.

In some embodiments the non-limiting term user equipment (UE) is used and it refers to any type of wireless device communicating with a network node and/or with another UE in a cellular or mobile communication system. Examples of UE are target device, device to device (D2D) UE, proximity capable UE (aka ProSe UE), machine type UE or UE capable of machine to machine (M2M) communication, PDA, PAD, Tablet, mobile terminals, smart phone, laptop embedded equipment (LEE), laptop mounted equipment (LME), USB dongles etc.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called primary cell (PCell) or primary serving cell (PSC). Similarly the secondary serving cell is interchangeably called secondary cell (SCell) or secondary serving cell (SSC).

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

As will be readily understood by those familiar with communications design, that functions, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviations

Abbreviation Explanation
ACK Acknowledged
ADC Analog-to-digital conversion
AGC Automatic gain control
ANR Automatic neighbor relations
AP Access point
BCH Broadcast channel
BLER Block error rate
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRTD Maximum receive timing difference
MSR Multi-standard radio
NACK Not acknowledged
OFDM Orthogonal frequency division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell SCG Secondary Cell Group
SeNB Secondary eNode B
SFN System frame number
SGW Signaling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink At last RAN4#80 meeting enhancements to current RLM procedure was discussed at high-level based on contribution in [1]. The eMTC operating scenario is different from the legacy LTE UEs as it can operate under different coverage enhancement levels. In this contribution, we discuss RLM procedure under this scenario and provide a more detailed view on the topic.

The eMTC UEs can operate under different coverage levels which are also known as normal coverage/CEModeA and enhanced coverage/CEModeB. The minimum SNR for which RAN4 requirements apply are −6 dB for normal coverage and −15 dB for enhanced coverage. Enhanced coverage operation is achieved by introducing repetitions in both uplink and downlink channels. The measurement accuracy requirement depends on coverage area. The normal coverage RRM measurement accuracy requirements are a bit tighter than the enhanced coverage measurement accuracy requirements wherein improved measurement techniques are used. The resources (e.g. repetition level, aggregation level, power boosting level, etc.) are allocated differently for the different coverage modes. In CEModeB significantly more resource might be needed in order to support operation down to −15 dB SNR which is not the case in CEModeA. Likewise, the core requirements also depends on the actual coverage mode.

The problem arises when the CRS based measurement which are subject to high-bias are used for evaluating the RLM.

The Qin and Qout SNR thresholds are configured by the network and it will depend on at least following network configured transmission parameters: repetition level (Rmax), aggregation level (Lmax), power boosting (if any), DCI format etc. In [1] two new types of events were proposed: event M1 and event M2. The event M1 is triggered when the downlink signal quality falls below a threshold Early_Qout_M1 and event M2 is triggered when the downlink signal quality falls above a threshold Early_Qin_M2. We understand the motivation of introducing such new event to enhance the radio link monitoring of the eMTC UEs when moving between different coverage levels. We also agree that this information can help the network to adapt the transmission parameters accordingly as well as the UE by preventing it from declaring RLF prematurely.

Our proposal is, however, slightly different from the ones proposed in [1] because in our proposal we would like to differentiate this new event type from the coverage level change signalling. It shall be noted that this new type of events are related to RLM and will depend on the configured Qin and Qout thresholds for evaluating the RLM. The new events could be defined as follows:

Event M1 which is triggered when UE is 'X' dB below Qout threshold

Event M2 which is triggered when UE is 'Y' dB above the Qin threshold where 'X' and 'Y' are configured by the serving network. But RAN4 should discuss the values of 'X' and 'Y' can be positive and negative.

The measurement accuracy requirements specified in [2] are only the minimum requirements. However, many of the UEs might be able to achieve much better measurement performance than the minimum requirements which are typically based on worst case. The achievable measurement accuracy will of course depend on UE implementation. In such cases, reporting the actual margin ('X' or 'Y') from the Qin or Qout can help the network to adapt its transmission parameters based on the reported information, and not based on worst case/minimum requirements. Similarly, when there are large bias in the measurements, and UE is about to declare RLF from e.g. 'X' dB, reporting such events to the network can provide some margin for the network to try to recover the link and keeping it in-sync by e.g. adapting the transmission parameters.

Moreover, along with the reported measurement event UE could also indicate (e.g. explicit indication of Rmax, Lmax or implicit indication by reporting an index that corresponds to a set of Rmax and Lmax) of the desired set of transmission parameters. Examples of such indicated parameters are Rmax, Lmax, power-boosting (if any) etc. This information can help the serving eNodeB further as it can use this information to select appropriate transmission parameters that work best for this particular UE. It is expected that a combination these new events (Event M1 and Event M2 along with UE indication) can bring significant improvement to the RLM performance of eMTC UEs.

Thus, based on the discussions above we make the following proposals:

Proposal: Two new events (Event M1 and Event M2) that are triggered when the UE is 'X' dB and 'Y' dB from the Qout and Qin thresholds respectively are defined for feMTC UEs. The events are reported along with some UE indicated information on desired transmission parameters (Rmax and Lmax).

Below we discuss how such indication can be performed, and provide some examples.

For example, the UE could report an index that corresponds to a specific set of repetition level and aggregation level that is required for maintaining the link in-sync. The reporting index could be based on a pre-defined table or network configured table. The reporting index could also depend on the actual coverage level of the UE, i.e. when UE is operating at normal coverage the table (Table 1) that could contain higher resolution in the lower values of 'X' could be used and when it is operating in enhanced coverage table (Table 2) that could contain higher resolution in the higher values of 'X' could be used. It can be noted that a similar approach has been used for reporting the power headroom in NB-IOT. It is expected that this type reporting can reduce the UE complexity and the power consumption in the UE.

TABLE 1

A single value (index) is reported by the
UE indicating RL and AL based on 'X'.

| Value of 'X' [dB] | Repetition level (RL) | Aggregation level (AL) | Reported Index |
|---|---|---|---|
| 0 | R0 | A0 | 0 |
| 1 | R1 | A1 | 1 |
| 2 | R2 | A2 | 2 |
| 4 | R3 | A3 | 3 |

TABLE 2

A single value (index) is reported by the
UE indicating RL and AL based on 'X'.

| Value of 'X' [dB] | Repetition level (RL) | Aggregation level (AL) | Reported Index |
|---|---|---|---|
| 4 | R3 | A3 | 3 |
| 6 | R4 | A4 | 4 |
| 8 | R5 | A5 | 5 |

Similar tables (e.g. Table 3) could be maintained by the network node that instead depends on Qin.

Alternatively, UE could report an index that is based on the measured SNR level or configured threshold 'X' or 'Y'. The reporting is done along with the triggered event report. One example of this type of reporting is shown in Table 3:

TABLE 3

SNR to reporting index mapping table

| Reported Index | Measured quantity value | Unit |
|---|---|---|
| 0 | SNR ≥ X1 | dB |
| 2 | X1 ≤ SNR ≤ X2 | dB |
| 3 | X2 ≤ SNR ≤ X3 | dB |
| ... | ... | ... |

These are only recommendations from the UEs that could be sent together with the event report (Event M1/M2). However, it is up to the serving eNodeB to decide and adapt the transmission parameters.

SUMMARY

In this contribution we have discussed enhancements to radio link monitoring procedure for feMTC. Based on the discussions, we have made the following proposals:

Proposal: Two new events (Event M1 and Event M2) that are triggered when the UE is 'X' dB and 'Y' dB from the Qout and Qin thresholds respectively are defined for feMTC UEs. The events are reported along with some UE indicated information on desired transmission parameters (Rmax and Lmax).

REFERENCES

[1] R4-166625, "RLM enhancements in Further enhanced MTC", Qualcomm Incorporated
[2] TS 36.133 v.13.0.0

The invention claimed is:

1. A method performed by a wireless device for enabling the wireless device to perform Radio Link Monitoring (RLM) of a cell of a network node in a wireless communication network, the method comprising:
based on RLM of downlink reference signal (RS) transmissions by the network node in the cell, determining one or more of the following recommendations for control channel transmissions by the network node:
at least one recommended repetition level, and
at least one recommended aggregation level;
transmitting, to the network node, information indicating the wireless device's capability to support enhanced event monitoring; and
subsequently transmitting, to the network node, an indication of the determined one or more recommendations for the control channel transmissions.

2. The method according to claim 1, further comprising determining the one or more recommendations by determining a configuration comprising transmission parameters of a control channel, which transmission parameters comprise the at least one recommended repetition level and/or the at least one recommended aggregation level.

3. The method according to claim 1, further comprising:
obtaining, from the network node, one or more event thresholds used to trigger an event in the wireless device; and
configuring lower layers of the wireless device for the event according to the obtained one or more event thresholds.

4. The method according to claim 1, further comprising obtaining information related to a decoding performance of a control channel.

5. The method according to claim 1, further comprising transmitting one or more of the following to the network node:
one or more event reports related to respective one or more events that are triggered by the wireless device, each based on one or more event thresholds;
recommended power boosting levels for the control channel transmissions; and
recommended transmission format of the control channel.

6. A method performed by a network node for enabling a wireless device in a wireless communication network to perform radio link Monitoring (RLM) of a cell of the network node, the method comprising:
obtaining information indicating the wireless device's capability to support enhanced event monitoring;
subsequently receiving, from the wireless device, an indication of one or more of the following recommendations for control channel transmissions by the network node:
at least one recommended repetition level, and
at least one recommended aggregation level; and
transmitting the control channel, to the wireless device, using transmission parameters that are selected based on the received recommendations, wherein the selected transmission parameters include one or more of the following: repetition level, aggregation level, power boosting level, and transmission format,
wherein the one or more recommendations are based on the wireless device's RLM of downlink reference signal (RS) transmissions by the network node in the cell.

7. The method according to claim 6, further comprising receiving one or more of the following additional information from the wireless device:
one or more event reports related to respective one or more events that are triggered by the wireless device, each based on one or more event thresholds;

recommended power boosting levels for the control channel transmissions; and recommended transmission format of the control channel, wherein the selected transmission parameters are further based on the received additional information.

8. The method according to claim 6, further comprising receiving, from the wireless device, one or more measurements of reference signals transmitted by the network node in the cell, wherein the selected transmission parameters are further based on the received measurements.

9. The method according to claim 6, further comprising determining a coverage level of the wireless device;

based on determined coverage level, determining one or more event thresholds; and signaling, to the wireless device, the one or more event thresholds.

10. A wireless device configured for performing Radio Link Monitoring (RLM) of a cell of a network node in a wireless communication network; the wireless device comprising:

one or more processors; and a computer-readable storage medium storing computer-executable instructions that, when executed by the one or more processors, configure the wireless device to:

based on RLM of downlink reference signal (RS) transmissions by the network node in the cell, determine one or more of the following recommendations for control channel transmissions by the network node:

at least one recommended repetition level, and at least one recommended aggregation level;

transmit, to the network node, information indicating the wireless device's capability to support enhanced event monitoring; and subsequently transmit, to the network node, an indication of the determined one or more recommendations for the control channel transmissions.

11. The wireless device according to claim 10, wherein execution of the instructions further configures the wireless device to determine the one or more recommendations by determining a configuration comprising transmission parameters of a control channel, which transmissions parameters comprise the at least one recommended repetition level and/or the at least one recommended aggregation level.

12. The wireless device according to claim 10, wherein execution of the instructions further configures the wireless device to:

obtain, from the network node, one or more event thresholds used to trigger an event in the wireless device; and configure lower layers of the wireless device for the event according to the obtained one or more event thresholds.

13. The wireless device according to claim 10, wherein execution of the instructions configures the wireless device to obtain information related to a decoding performance of a control channel.

14. The wireless device according to claim 10, wherein execution of the instructions further configures the wireless device to transmit one or more of the following to the network node:

one or more event reports related to respective one or more events that are triggered by the wireless device, each based on one or more event thresholds;

recommended power boosting levels for the control channel transmissions; and recommended transmission format of the control channel.

15. A network node for enabling a wireless device in a wireless communication network to perform radio link Monitoring (RLM) of a cell of the network node, the network node comprising:

one or more processors; and a computer-readable storage medium storing computer-executable instructions that, when executed by the one or more processors, configure the network node to:

obtain information indicating the wireless device's capability to support enhanced event monitoring;

subsequently receive, from the wireless device, an indication of one or more of the following recommendations for control channel transmissions by the network node:

at least one recommended repetition level, and at least one recommended aggregation level; and transmit the control channel, to the wireless device, using transmission parameters that are selected based on the received recommendations, wherein the selected transmission parameters include one or more of the following: repetition level, aggregation level, power boosting level, and transmission format, wherein the one or more recommendations are based on the wireless device's RLM of downlink reference signal (RS) transmissions by the network node in the cell.

16. The network node according to claim 15, wherein execution of the instructions further configures the network node to receive one or more of the following additional information from the wireless device:

one or more event reports related to respective one or more events that are triggered by the wireless device, each based on one or more event thresholds;

recommended power boosting levels for the control channel transmissions; and recommended transmission format of the control channel, wherein the selected transmission parameters are further based on the received additional information.

17. The network node according to claim 15, wherein execution of the instructions further configures the network node to receive, from the wireless device, one or more measurements of reference signals transmitted by the network node in the cell, wherein the selected transmission parameters are further based on the received measurements.

18. The network node according to claim 15, wherein execution of the instructions further configures the network node to:

determine a coverage level of the wireless device;

determine, based on determined coverage level, one or more event thresholds; and signal, to the wireless device, the one or more event thresholds.

* * * * *